United States Patent
Gourlay et al.

(10) Patent No.: US 9,222,693 B2
(45) Date of Patent: Dec. 29, 2015

(54) TOUCHSCREEN DEVICE USER INTERFACE FOR REMOTE CONTROL OF A THERMOSTAT

(71) Applicant: Nest Labs, Inc., Palo Alto, CA (US)

(72) Inventors: Alastair R. Gourlay, Boulder Creek, CA (US); Timo A. Bruck, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 426 days.

(21) Appl. No.: 13/871,852

(22) Filed: Apr. 26, 2013

(65) Prior Publication Data

US 2014/0319232 A1 Oct. 30, 2014

(51) Int. Cl.
*F24F 11/00* (2006.01)
*G05D 23/19* (2006.01)

(52) U.S. Cl.
CPC ........... *F24F 11/006* (2013.01); *F24F 11/0086* (2013.01); *G05D 23/1905* (2013.01); *F24F 2011/0068* (2013.01); *F24F 2011/0071* (2013.01); *F24F 2011/0091* (2013.01); *F25B 2600/07* (2013.01)

(58) Field of Classification Search
CPC ..... F24F 11/00; F24F 11/0009; F24F 11/006; F24F 11/0086; F24F 2011/00; F24F 2011/0009; F24F 2011/0068; F24F 2011/0086; F24F 2011/0071; F24F 2011/0091; F25B 2600/07; G05D 23/19; G05D 23/1917
USPC ............. 62/157–158, 231, 264; 700/276, 278
See application file for complete search history.

(56) References Cited

U.S. PATENT DOCUMENTS

| 4,621,336 | A | 11/1986 | Brown |
|---|---|---|---|
| D321,903 | S | 11/1991 | Chepaitis |
| D341,848 | S | 11/1993 | Bigelow et al. |
| 5,460,327 | A | 10/1995 | Hill et al. |

(Continued)

FOREIGN PATENT DOCUMENTS

| EP | 1703356 | 9/2011 |
|---|---|---|
| JP | 10023565 | 1/1998 |

OTHER PUBLICATIONS

International Search Report and Written Opinion mailed Aug. 28, 2014 for International Patent Application No. PCT/US2014/034924 filed Apr. 22, 2014, 15 pages.

(Continued)

*Primary Examiner* — Jonathan Bradford
(74) *Attorney, Agent, or Firm* — Kilpatrick Townsend & Stockton LLP

(57) ABSTRACT

Systems and methods are described for interactively and graphically interfacing with a user on an HVAC system controlled by a thermostat. The user interface is implemented on a touch screen display on a remote wirelessly connected device such as smartphone or a tablet PC. The interface displays a screen that mimics the display on the thermostat including allowing one or more input methods that are analogous to input methods used on the thermostat. Touch screen gestures such as touch and drag, touch and hold and tapping are used in an intuitive way. The user experience is enhanced by allowing large-scale changes while reducing the risk of sudden unintended changes. The control signals are judiciously tailored to protect the HVAC equipment from unwarranted over-controlling, reduce unnecessary network traffic, and prevent the waste of energy.

32 Claims, 26 Drawing Sheets

(56) References Cited

U.S. PATENT DOCUMENTS

| | | |
|---|---|---|
| D396,488 S | 7/1998 | Kunkler |
| 5,959,621 A | 9/1999 | Nawaz et al. |
| 5,973,662 A | 10/1999 | Singers et al. |
| 6,020,881 A | 2/2000 | Naughton et al. |
| D428,399 S | 7/2000 | Kahn et al. |
| 6,122,603 A | 9/2000 | Budike, Jr. |
| 6,211,921 B1 | 4/2001 | Cherian et al. |
| D450,059 S | 11/2001 | Itou |
| 6,351,693 B1 | 2/2002 | Monie et al. |
| 6,453,687 B2 | 9/2002 | Sharood et al. |
| D464,660 S | 10/2002 | Weng et al. |
| 6,595,430 B1 | 7/2003 | Shah |
| 6,622,925 B2 | 9/2003 | Carner et al. |
| D480,401 S | 10/2003 | Kahn et al. |
| 6,641,054 B2 | 11/2003 | Morey |
| 6,641,055 B1 | 11/2003 | Tiernan |
| D485,279 S | 1/2004 | DeCombe |
| 6,726,112 B1 | 4/2004 | Ho |
| D491,956 S | 6/2004 | Ombao et al. |
| D497,617 S | 10/2004 | Decombe et al. |
| 6,824,069 B2 | 11/2004 | Rosen |
| 6,851,621 B1 | 2/2005 | Wacker et al. |
| 6,891,838 B1 | 5/2005 | Petite et al. |
| D511,527 S | 11/2005 | Hernandez et al. |
| 7,028,912 B1 | 4/2006 | Rosen |
| 7,038,667 B1 | 5/2006 | Vassallo et al. |
| 7,055,759 B2 | 6/2006 | Wacker et al. |
| 7,108,194 B1 | 9/2006 | Hankins, II |
| 7,111,788 B2 | 9/2006 | Reponen |
| 7,142,948 B2 | 11/2006 | Metz |
| 7,152,806 B1 | 12/2006 | Rosen |
| 7,181,317 B2 | 2/2007 | Amundson et al. |
| 7,222,494 B2 | 5/2007 | Peterson et al. |
| 7,222,800 B2 | 5/2007 | Wruck |
| 7,225,054 B2 | 5/2007 | Amundson et al. |
| D544,877 S | 6/2007 | Sasser |
| D550,691 S | 9/2007 | Hally et al. |
| 7,274,972 B2 | 9/2007 | Amundson et al. |
| 7,302,642 B2 | 11/2007 | Smith et al. |
| 7,418,663 B2 | 8/2008 | Pettinati et al. |
| 7,427,926 B2 | 9/2008 | Sinclair et al. |
| 7,434,742 B2 | 10/2008 | Mueller et al. |
| D588,152 S | 3/2009 | Okada |
| D589,792 S | 4/2009 | Clabough et al. |
| D590,412 S | 4/2009 | Saft et al. |
| D593,120 S | 5/2009 | Bouchard et al. |
| D594,015 S | 6/2009 | Singh et al. |
| D595,309 S | 6/2009 | Saski et al. |
| D596,194 S | 7/2009 | Vu et al. |
| D597,101 S | 7/2009 | Chaudhri et al. |
| D598,463 S | 8/2009 | Hirsch et al. |
| 7,571,014 B1 | 8/2009 | Lambourne et al. |
| D599,810 S | 9/2009 | Scalisi et al. |
| D603,421 S | 11/2009 | Ebeling et al. |
| D604,740 S | 11/2009 | Matheny et al. |
| 7,620,996 B2 | 11/2009 | Torres et al. |
| D607,001 S | 12/2009 | Ording |
| 7,667,163 B2 | 2/2010 | Ashworth et al. |
| D613,301 S | 4/2010 | Lee et al. |
| D614,194 S | 4/2010 | Guntaur et al. |
| D614,196 S | 4/2010 | Guntaur et al. |
| 7,703,694 B2 | 4/2010 | Mueller et al. |
| D615,546 S | 5/2010 | Lundy et al. |
| D616,460 S | 5/2010 | Pearson et al. |
| 7,721,209 B2 | 5/2010 | Tilton |
| D619,613 S | 7/2010 | Dunn |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| D630,649 S | 1/2011 | Tokunaga et al. |
| 7,890,195 B2 | 2/2011 | Bergman et al. |
| 7,900,849 B2 | 3/2011 | Barton et al. |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| D648,735 S | 11/2011 | Arnold et al. |
| 8,091,794 B2 | 1/2012 | Siddaramanna et al. |
| 8,136,052 B2 | 3/2012 | Shin et al. |
| D656,950 S | 4/2012 | Shallcross et al. |
| D656,952 S | 4/2012 | Weir et al. |
| 8,156,060 B2 | 4/2012 | Borzestowski et al. |
| 8,166,395 B2 | 4/2012 | Omi et al. |
| D658,674 S | 5/2012 | Shallcross et al. |
| 8,185,164 B2 | 5/2012 | Kim |
| D663,743 S | 7/2012 | Tanghe et al. |
| D663,744 S | 7/2012 | Tanghe et al. |
| D664,559 S | 7/2012 | Ismail et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,281,244 B2 | 10/2012 | Neuman et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| 8,387,891 B1 | 3/2013 | Simon et al. |
| 8,406,816 B2 * | 3/2013 | Marui ................ G06F 3/04886 345/173 |
| 8,421,602 B2 | 4/2013 | Madonna et al. |
| 8,442,752 B2 | 5/2013 | Wijaya et al. |
| 2003/0034898 A1 | 2/2003 | Shamoon et al. |
| 2004/0055446 A1 | 3/2004 | Robbin et al. |
| 2004/0074978 A1 | 4/2004 | Rosen |
| 2004/0260427 A1 | 12/2004 | Wimsatt |
| 2004/0262410 A1 | 12/2004 | Hull |
| 2005/0071780 A1 | 3/2005 | Muller et al. |
| 2005/0119766 A1 | 6/2005 | Amundson et al. |
| 2005/0159847 A1 | 7/2005 | Shah et al. |
| 2005/0194456 A1 | 9/2005 | Tessier et al. |
| 2007/0045433 A1 | 3/2007 | Chapman et al. |
| 2007/0057079 A1 | 3/2007 | Stark et al. |
| 2007/0115902 A1 | 5/2007 | Shamoon et al. |
| 2007/0173978 A1 | 7/2007 | Fein et al. |
| 2007/0228183 A1 | 10/2007 | Kennedy et al. |
| 2007/0278320 A1 | 12/2007 | Lunacek et al. |
| 2008/0006709 A1 | 1/2008 | Ashworth et al. |
| 2008/0048046 A1 | 2/2008 | Wagner et al. |
| 2008/0215240 A1 | 9/2008 | Howard et al. |
| 2008/0256475 A1 | 10/2008 | Amundson et al. |
| 2009/0001181 A1 | 1/2009 | Siddaramanna et al. |
| 2009/0140057 A1 | 6/2009 | Leen |
| 2009/0140060 A1 | 6/2009 | Stoner et al. |
| 2009/0140061 A1 * | 6/2009 | Schultz ............... F24F 11/0012 236/51 |
| 2009/0140064 A1 | 6/2009 | Schultz et al. |
| 2009/0143918 A1 | 6/2009 | Amundson et al. |
| 2009/0263773 A1 | 10/2009 | Kotlyar et al. |
| 2009/0273610 A1 | 11/2009 | Busch et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070907 A1 | 3/2010 | Harrod et al. |
| 2010/0084482 A1 | 4/2010 | Kennedy et al. |
| 2010/0106305 A1 | 4/2010 | Pavlak et al. |
| 2010/0107070 A1 | 4/2010 | Devineni et al. |
| 2010/0107076 A1 | 4/2010 | Grohman et al. |
| 2010/0107103 A1 | 4/2010 | Wallaert et al. |
| 2010/0168924 A1 | 7/2010 | Tessier et al. |
| 2010/0198425 A1 * | 8/2010 | Donovan ............ G05D 23/1904 700/299 |

(56) References Cited

U.S. PATENT DOCUMENTS

| | | |
|---|---|---|
| 2010/0289643 A1 | 11/2010 | Trundle et al. |
| 2011/0015797 A1 | 1/2011 | Gilstrap |
| 2011/0022242 A1 | 1/2011 | Bukhin et al. |
| 2011/0046806 A1 | 2/2011 | Nagel et al. |
| 2011/0054710 A1 | 3/2011 | Imes et al. |
| 2011/0167369 A1 | 7/2011 | van Os |
| 2011/0257795 A1* | 10/2011 | Narayanamurthy .. F24F 5/0046 700/277 |
| 2011/0282937 A1 | 11/2011 | Deshpande et al. |
| 2012/0005590 A1* | 1/2012 | Lombard ............... H04L 63/12 715/742 |
| 2012/0101637 A1 | 4/2012 | Imes et al. |
| 2012/0130547 A1 | 5/2012 | Fadell et al. |
| 2012/0131504 A1 | 5/2012 | Fadell et al. |
| 2012/0185801 A1 | 7/2012 | Madonna et al. |
| 2012/0191257 A1 | 7/2012 | Corcoran et al. |
| 2012/0252430 A1 | 10/2012 | Imes et al. |
| 2012/0296488 A1* | 11/2012 | Dharwada ............. H02J 13/001 700/296 |
| 2013/0014057 A1 | 1/2013 | Reinpoldt et al. |
| 2013/0099011 A1 | 4/2013 | Matsuoka et al. |

OTHER PUBLICATIONS

Detroitborg, Nest Learning Thermostat: Unboxing and Review, [online], retrieved from the Internet: <URL: http://www.youtube.com/watch?v=KrgcOL4oLzc> [retrieved on Aug. 22, 2013], Feb. 2012.

Nest Learning Thermostat v1.0 [Product Brochure]. Nest Labs, Oct. 25, 2011; 5 pages, plus publication date addendum.

U.S. Office Action mailed on Jan. 29, 2015 for U.S. Appl. No. 14/464,647, filed Aug. 20, 2014, all pages.

* cited by examiner

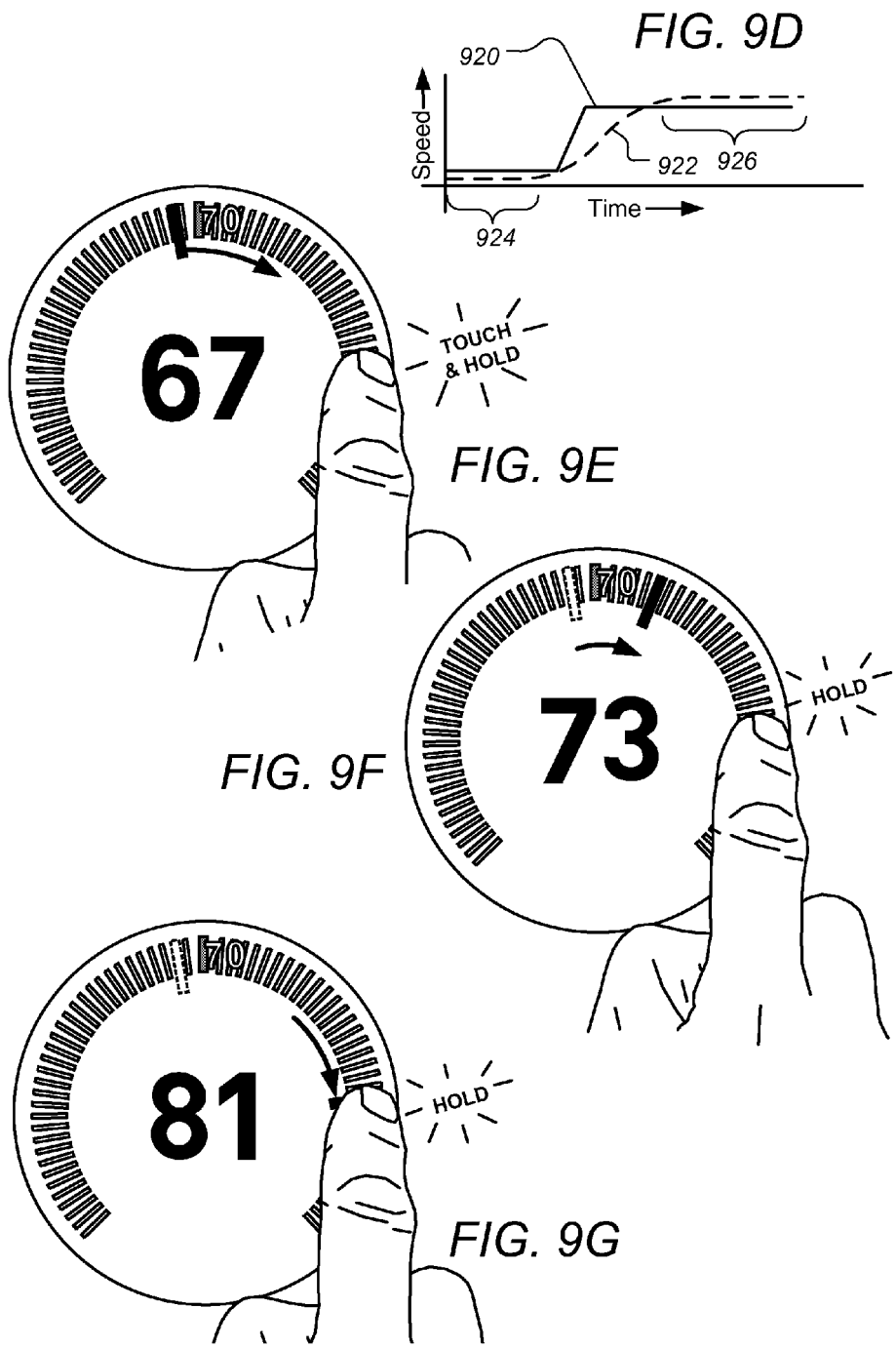

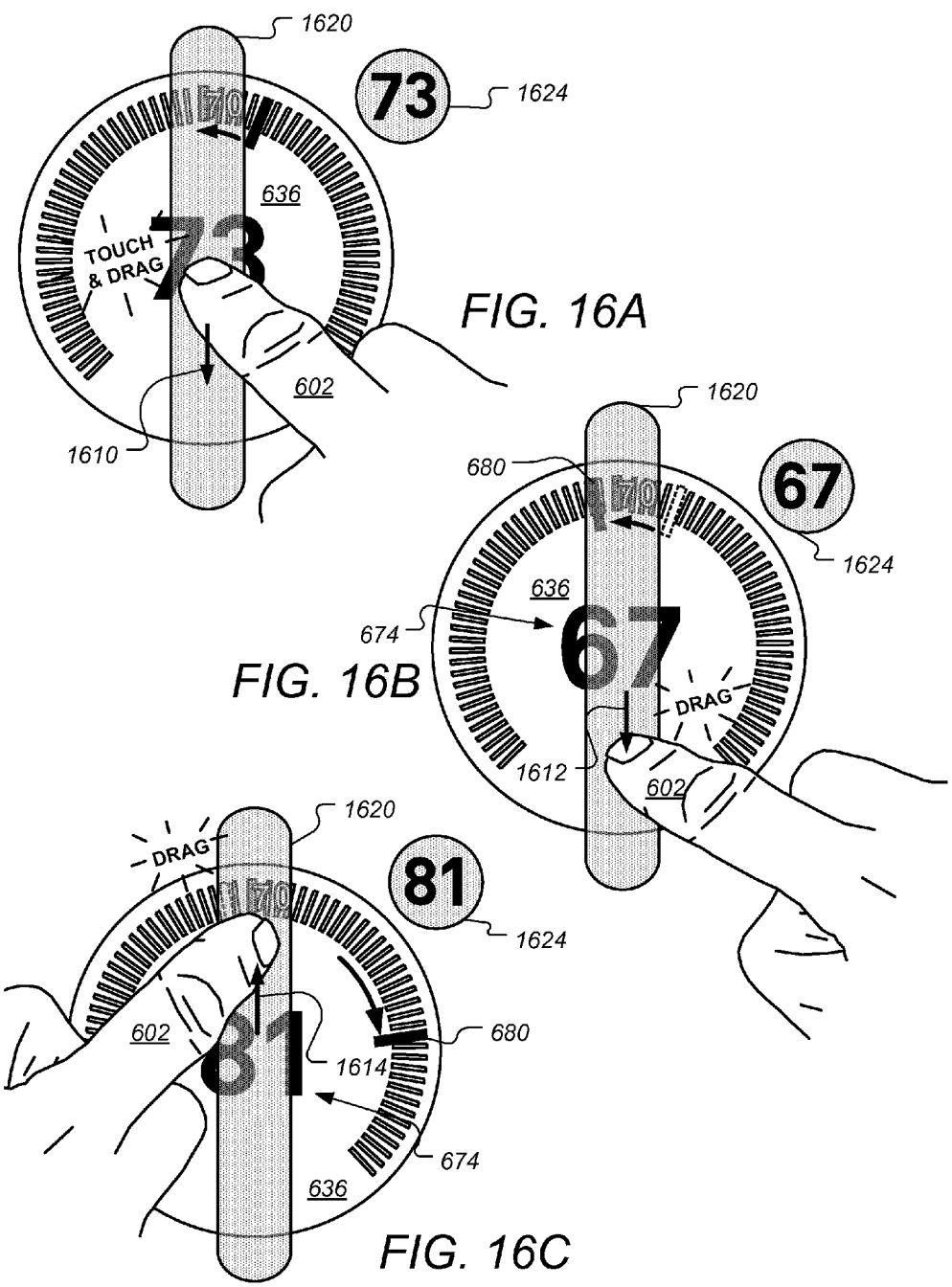

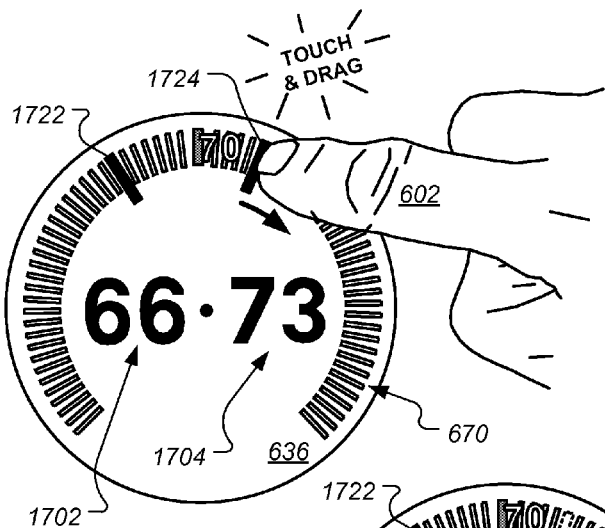
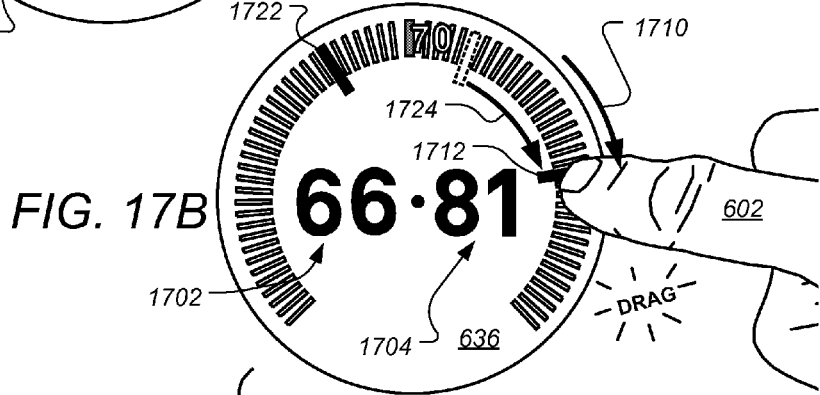
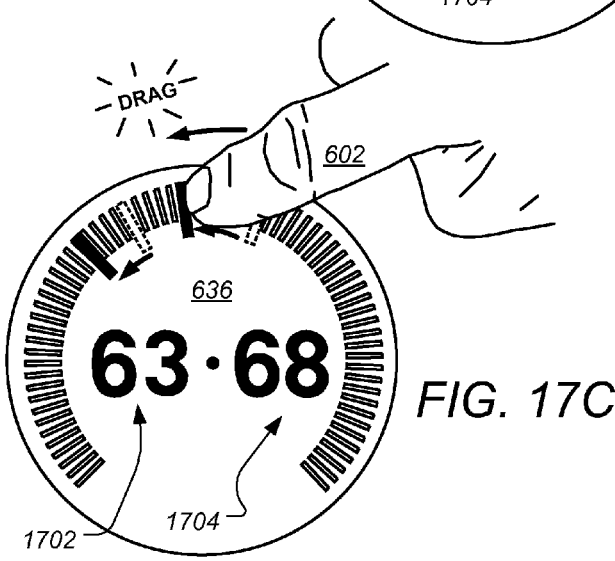

TOUCHSCREEN DEVICE USER INTERFACE FOR REMOTE CONTROL OF A THERMOSTAT

FIELD

This patent specification relates to systems, methods, and related computer program products for the monitoring and control of energy-consuming systems or other resource-consuming systems. More particularly, this patent specification relates to user interfaces for thermostat temperature setpoint modification on smartphone or other space-limited touch-screen device.

BACKGROUND

In designing touch-screen based user interfaces for remotely controlling a network-connected programmable thermostat, it is desirable to provide a high level of user-friendliness and intuitiveness. Additionally, when using a wireless communication technology over a computer network, it is desirable to impact network traffic as little as possible. Notably, the above-stated goals of user-friendliness, intuitiveness, and low network impact are shared with many different remote control scenarios, and it is indeed recognized that some progress has been made in the art toward these goals, as reflected, for example, in U.S. Pat. No. 8,239,784, WO 2012118626, and US20080084400, each of which is incorporated by reference herein. However, it has been found that remote control of an HVAC system brings about one or more unique combinations of issues that need to be simultaneously resolved, all the while continuing to provide user-friendliness and intuitiveness. By way of example, it has been found desirable to provide a remote control user interface for a thermostat in which the actual resultant control signals are judiciously tailored to protect the HVAC equipment from unwarranted over-controlling, reduce unnecessary network traffic, and prevent the waste of energy, while at the same time providing a user interface experience in which the user perceives a high degree of control, a sense that they are "in command", of an intuitive and delightfully easy-to-use temperature control system.

SUMMARY

When controlling HVAC equipment, it has been found that certain combinations of controls should be minimized so as to protect certain types of equipment. For example, repeated on/off commands during a short time interval can cause excessive wear, damage, and/or malfunction of certain types of HVAC equipment. According to some embodiments a user-friendly graphical user interface (GUI) is described for adjusting an immediate control set point temperature for round thermostat having circular control member surrounding display.

According to some embodiments the user experience is enhanced by allowing large-scale changes while reducing the risk of sudden unintended changes. In particular, reducing or eliminating "surprising" changes, have been found to profoundly degrade the user's interface experience. Surprising and/or sudden large changes have also been found to lead to a user perception of poor quality.

According to some embodiments, the impact on network traffic is reduced. Overly heavy traffic increases risk of data corruption and also has battery implications, since each device is woken-up for the update. Furthermore, the risk of impacting HVAC system devices due to repeated conflicting commands is also reduced. For example, certain components such as the fan are not normally protected against turning on/off quickly. However, there will still be a large inductive load cycle with fan going on/off/on/off. Additionally, according to some embodiments there is a reduced risk of excessive user interaction (e.g. over-playfulness).

According to one or more embodiments, a method is described for interactively and graphically interfacing with a user of an HVAC system controlled by a thermostat. The thermostat includes a housing, a ring-shaped user-interface component, a processing system, and an electronic display. The method includes: on a touch-screen display in a location separate and apart from the thermostat, graphically displaying a circular region and one or more control symbols located thereon, the one or more control symbols graphically representing user manipulation of the ring-shaped user-interface component on the thermostat; detecting user input motion on the touch screen display in response to a touch and drag gesture by a user which is representative of user manipulation of the ring-shaped user-interface component on the thermostat; dynamically identifying a setpoint temperature value based on the detected user input motion; on the touch-screen display, dynamically displaying in real-time information representative of the identified set point temperature value on the circular region of the touch-screen display; waiting for an amount of time such that there is a relatively high likelihood that the identified setpoint temperature value corresponds to a setpoint temperature desired by the user; and wirelessly transmitting data representative of the identified setpoint temperature value.

According to some other embodiments, another method is described for interactively and graphically interfacing with a user of an HVAC system controlled by a thermostat. The thermostat comprising a housing, a ring-shaped user-interface component, a processing system and a rounded electronic display. On the thermostat display, a temperature marker symbol moves along an arc-shaped path near an outer periphery of the electronic display in response to rotation of the ring-shaped control member. The method includes: on a touch-screen display device in a location separate and apart from the thermostat, graphically displaying a circular region and an arc-shaped path near an outer periphery thereof, and a temperature control marker symbol that is positioned along the arc-shaped path of the circular region at a position associated with a current setpoint temperature value; detecting a user input gesture on the touch screen display in response to a touch and hold gesture by a user at a location on the arc-shaped path displayed on the circular region; gradually moving the temperature control marker symbol along the arc-shaped path on the circular region towards the location of the touch and hold gesture; dynamically identifying a setpoint temperature value based on the detected user input gesture; and wirelessly transmitting data representative of the identified setpoint temperature value.

According to some embodiments, a system is described for interactively and graphically interfacing with a user of an HVAC system. The described system includes: a thermostat with a housing, a ring-shaped user-interface component, a processing system configured to control an HVAC system based at least in part on a comparison of a measured ambient air temperature and a setpoint temperature value and a rounded electronic display under operative control of the processing. The described system also includes a touch screen display device operable from a location separate and apart from the thermostat, the touch screen display device including a touch screen display and a processing system communicatively coupled thereto. The display device processing system is programmed and configured to: graphically display a circular region and one or more control symbols located thereon, the one or more control symbols graphically representing user manipulation of the ring-shaped user-interface component on the thermostat; detect user input motion on the touch screen display in response to a touch and drag gesture by a user which is a representative of user manipulation of the ring-shaped user-interface component on the thermostat; dynamically identify a setpoint temperature value based on the detected user input motion; on the touch screen display, dynamically display in real-time information representative of the identified set point temperature value corresponding to a setpoint temperature desired by the user; waiting for an amount of time such that there is a relatively high likelihood that the identified setpoint temperature value corresponding to a setpoint temperature desired by the user; and wirelessly transmitting data representative of the identified setpoint temperature value so as to update the setpoint temperature value of the thermostat.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIGS. 9A-9G illustrate aspects of a graphical user interface on a touch-screen device for remotely controlling a network connected programmable thermostat, according to some embodiments;

FIGS. 16A-C illustrate aspects of a graphical user interface on a touch-screen device for remotely controlling a network connected programmable thermostat, according to some other embodiments;

FIGS. 17A-C illustrate aspects of a graphical user interface on a touch-screen device for remotely controlling a network connected programmable thermostat operating in a range-mode, according to some other embodiments;

DETAILED DESCRIPTION

Figure 1:
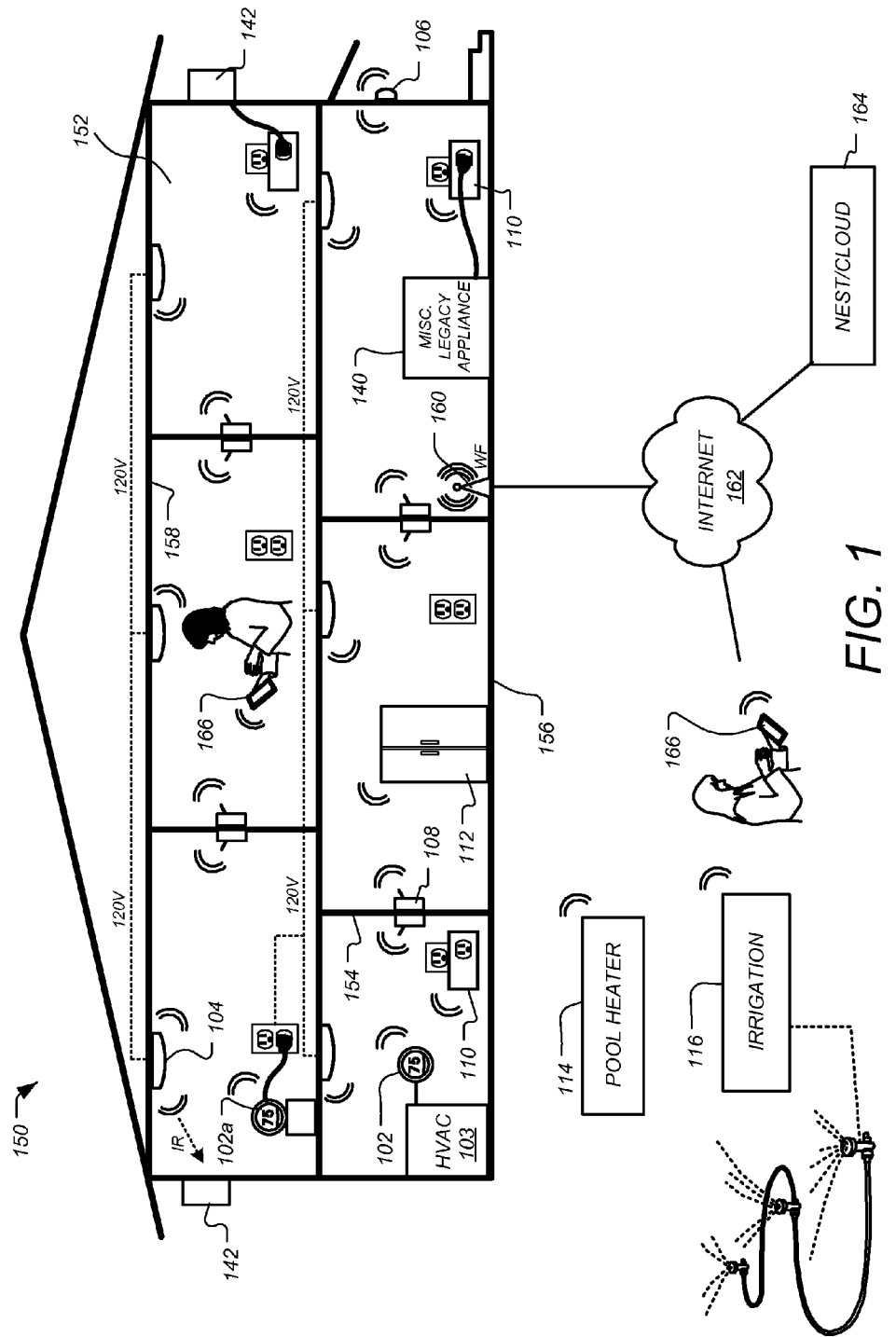
FIG. 1 illustrates an example of a smart home environment within which one or more of the devices, methods, systems, services, and/or computer program products described further herein can be applicable.

The subject matter of this patent specification relates to the subject matter of the following commonly assigned applications, each of which is incorporated by reference herein: U.S. Ser. No. 13/624,875 filed Sep. 21, 2012; U.S. Ser. No. 13/434,560 filed Mar. 29, 2012; International Application No. PCT/US12/00007 filed Jan. 3, 2012; U.S. Ser. No. 13/466,815 filed May 8, 2012; U.S. Ser. No. 13/467,025; U.S. Ser. No. 13/351,688 filed Jan. 17, 2012, which issued as U.S. Pat. No. 8,195,313 on Jun. 5, 2012; U.S. Ser. No. 13/317,423 filed Oct. 17, 2011; U.S. Ser. No. 13/269,501 filed Oct. 7, 2011; U.S. Ser. No. 61/627,996 filed Oct. 21, 2011; U.S. Ser. No. 61/429,093 filed Dec. 31, 2010; U.S. Ser. No. 61/415,771 filed Nov. 19, 2010; and U.S. Ser. No. 12/881,430 filed Sep. 14, 2010. The above-referenced patent applications are collectively referenced herein as "the commonly assigned" applications.

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
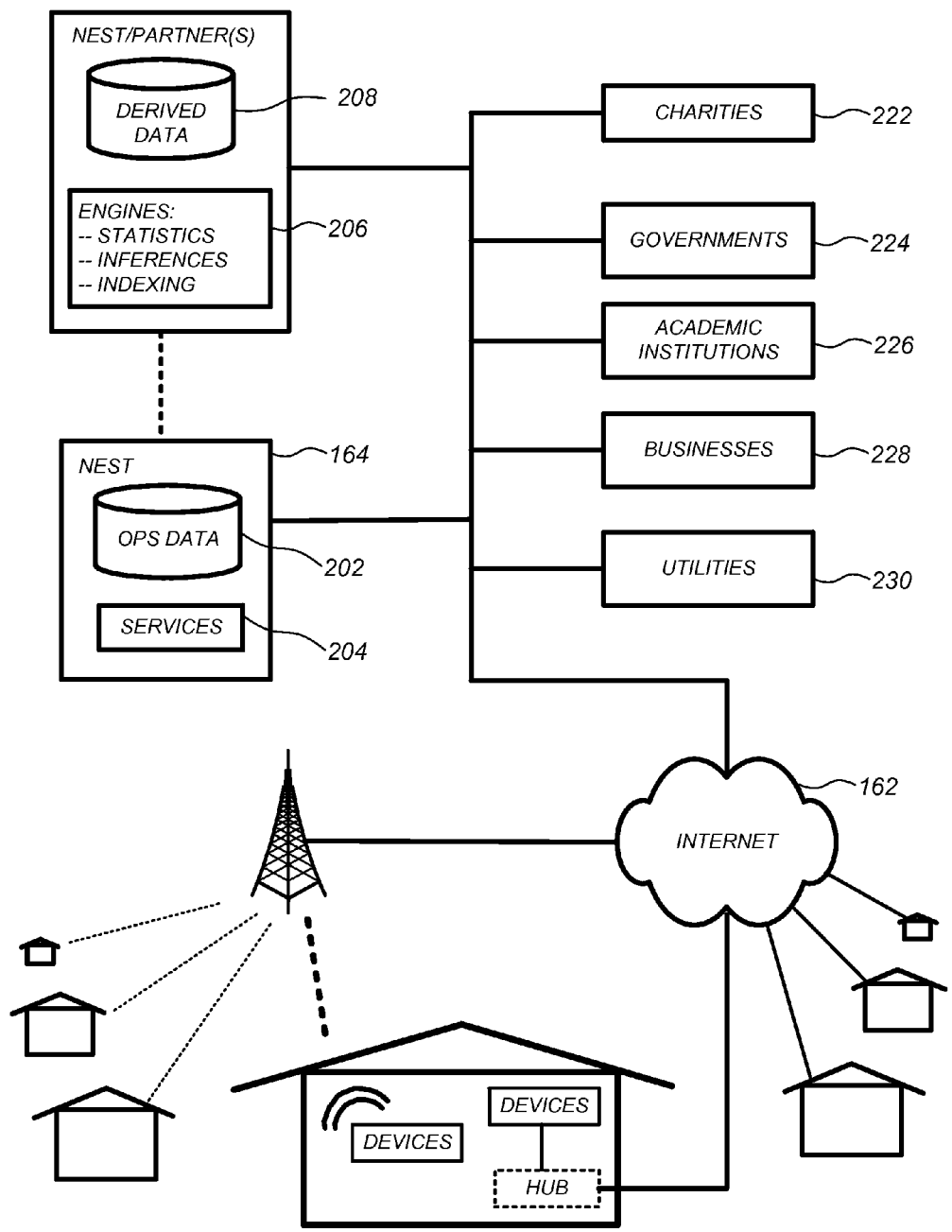
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
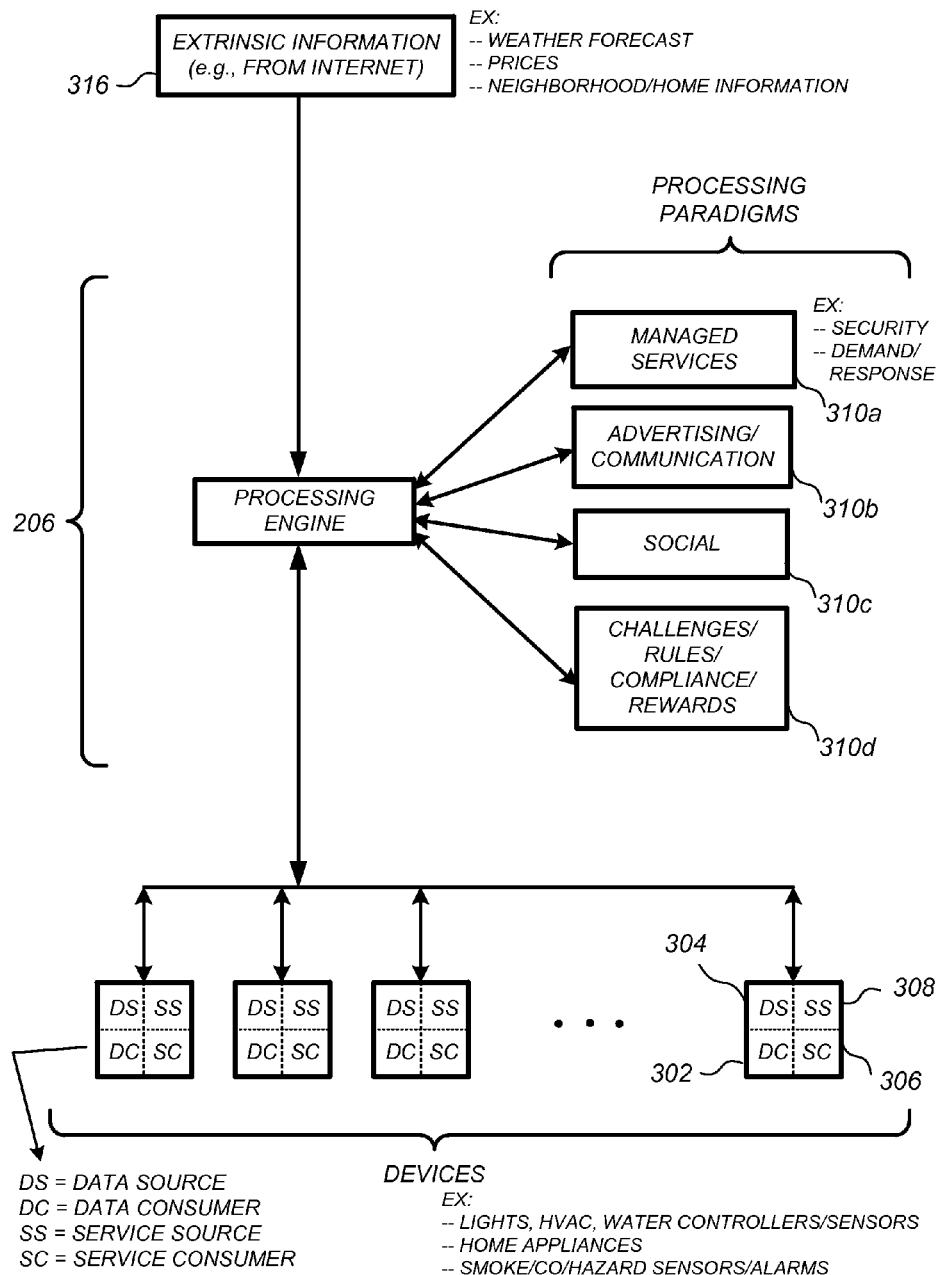
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4:
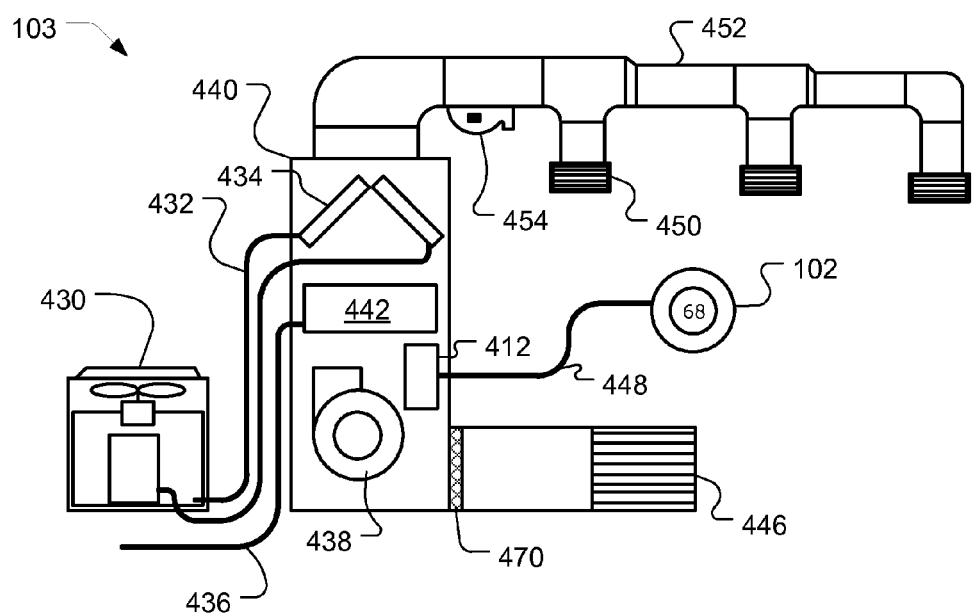
FIG. 4 is a schematic diagram of an HVAC system, according to some embodiments.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a gas such as Freon through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

Figures 5A, 5B:
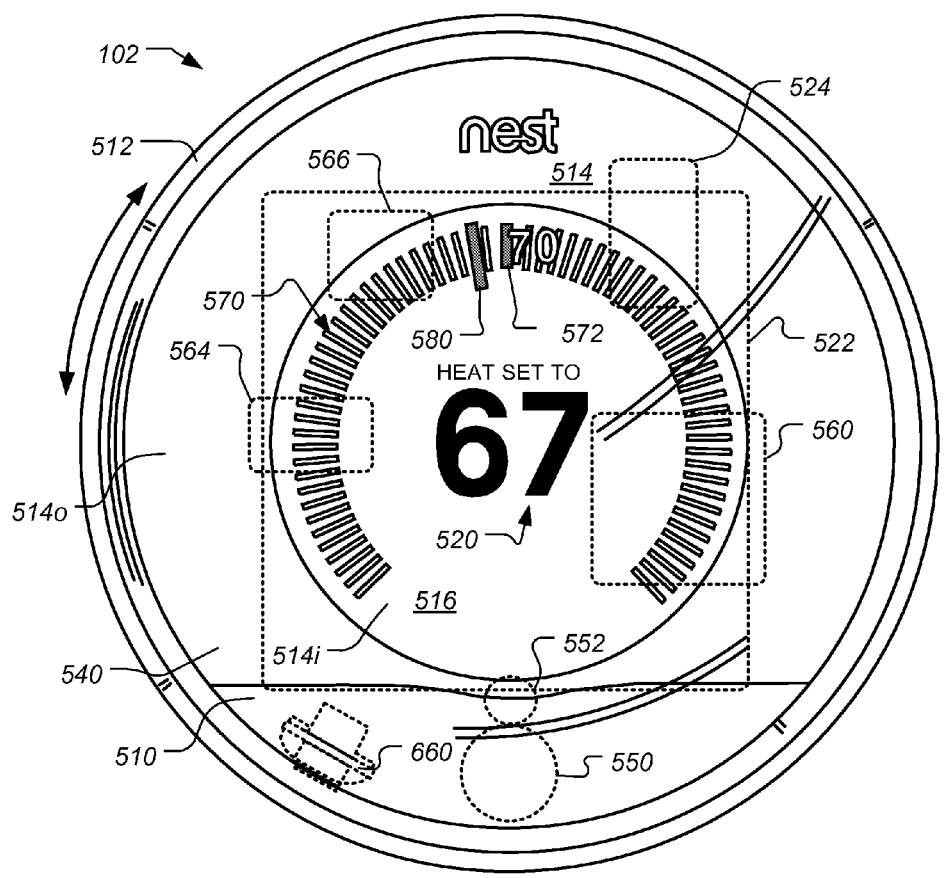
FIGS. 5A-5D illustrate a thermostat having a visually pleasing, smooth, sleek and rounded exterior appearance while at the same time including one or more sensors for detecting occupancy and/or users, according to some embodiments.
Figure 5C:
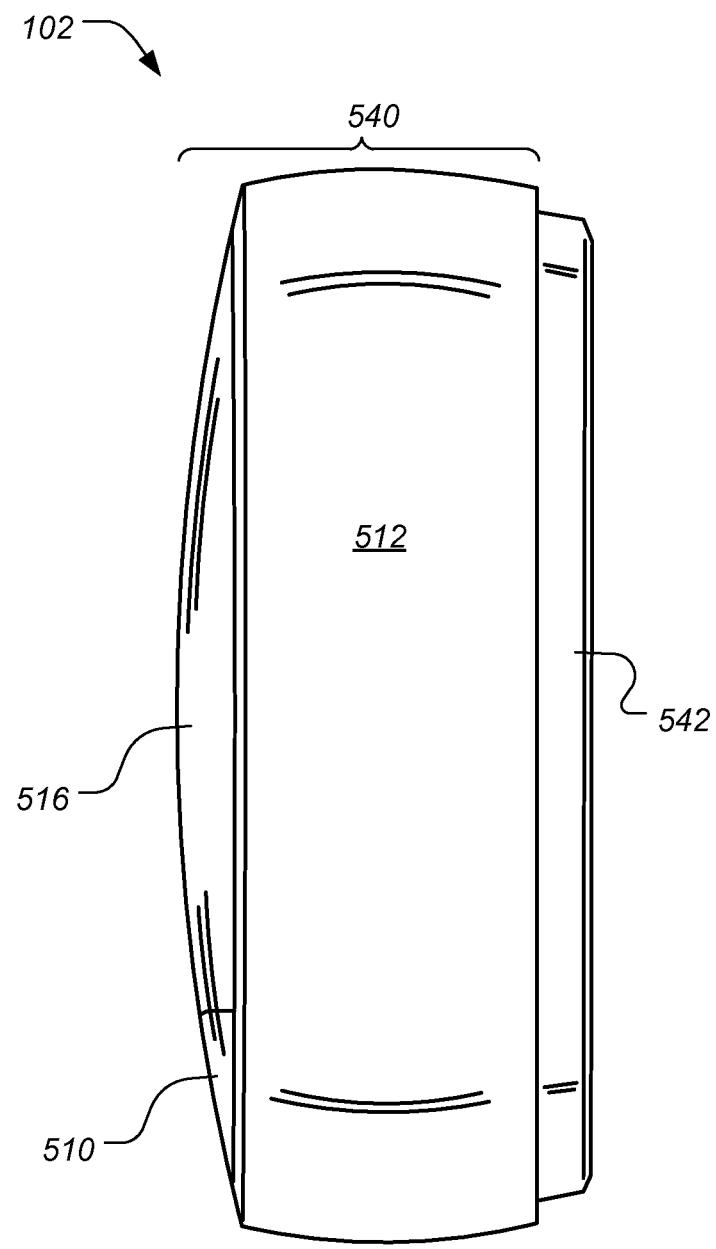
Figure 5D:
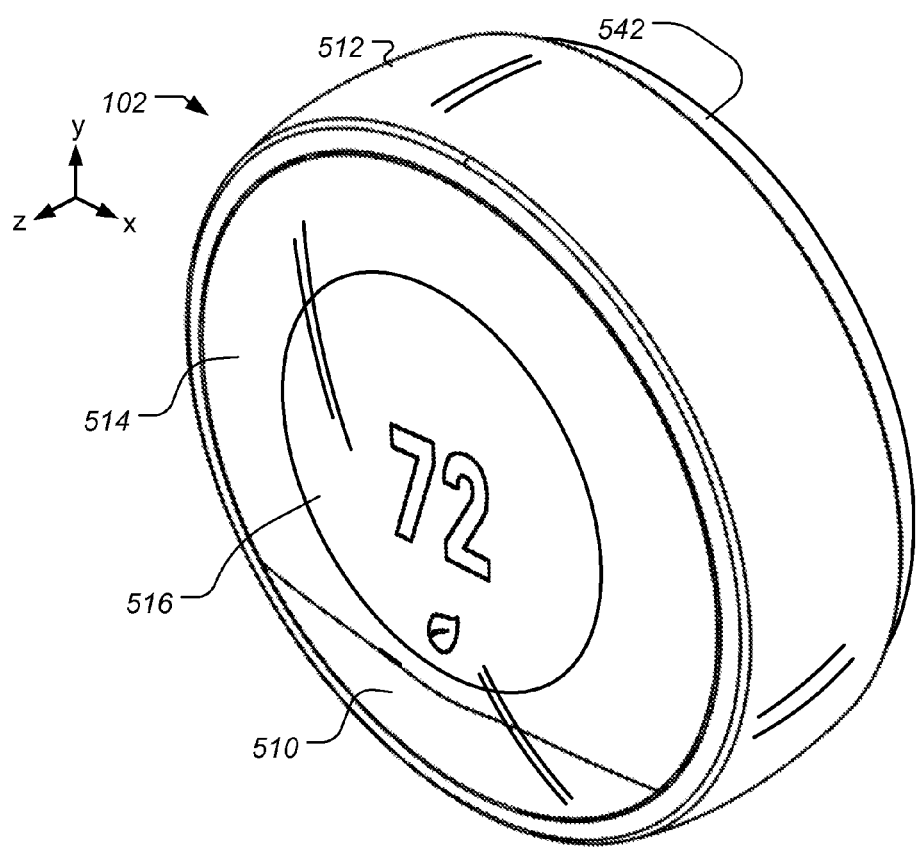

FIGS. 5A-5D illustrate a thermostat having a visually pleasing, smooth, sleek and rounded exterior appearance while at the same time including one or more sensors for detecting occupancy and/or users, according to some embodiments. FIG. 5A is front view, FIG. 5B is a bottom elevation, FIG. 5C is a right side elevation, and FIG. 5D is prospective view of thermostat 102. Unlike many prior art thermostats, thermostat 102 has a sleek, simple, uncluttered and elegant design that does not detract from home decoration, and indeed can serve as a visually pleasing centerpiece for the immediate location in which it is installed. Moreover, user interaction with thermostat 102 is facilitated and greatly enhanced over known conventional thermostats by the design of thermostat 102. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 is circular in shape in that it appears as a generally disk-like circular object when mounted on the wall. Thermostat 102 has a large convex rounded front face lying inside the outer ring 512. According to some embodiments, thermostat 102 is approximately 80 mm in diameter and protrudes from the wall, when wall mounted, by 32 mm. The outer rotatable ring 512 allows the user to make adjustments, such as selecting a new setpoint temperature. For example, by rotating the outer ring 512 clockwise, the realtime (i.e. currently active) setpoint temperature can be increased, and by rotating the outer ring 512 counter-clockwise, the realtime setpoint temperature can be decreased. The front face of the thermostat 102 comprises a clear cover 514 that according to some embodiments is polycarbonate, and a Fresnel lens 510 having an outer shape that matches the contours of the curved outer front face of the thermostat 102. According to some embodiments, the Fresnel lens elements are formed on the interior surface of the Fresnel lens piece 510 such that they are not obviously visible by viewing the exterior of the thermostat 102. Behind the Fresnel lens is a passive infrared sensor 550 for detecting occupancy, and the Fresnel lens piece 510 is made from a high-density polyethylene (HDPE) that has an infrared transmission range appropriate for sensitivity to human bodies. As shown in FIGS. 5A-5D, the front edge of rotating ring 512, front face 514 and Fresnel lens 510 are shaped such that they together form a, integrated convex rounded front face that has a common outward arc or spherical shape gently arcing outward.

Although being formed from a single lens-like piece of material such as polycarbonate, the cover 514 has two different regions or portions including an outer portion 514*o* and a central portion 514*i*. According to some embodiments, the cover 514 is painted or smoked around the outer portion 514*o*, but leaves the central portion 514*i* visibly clear so as to facilitate viewing of an electronic display 516 disposed thereunderneath. According to some embodiments, the curved cover 514 acts as a lens that tends to magnify the information being displayed in electronic display 516 to users. According to some embodiments the central electronic display 516 is a dot-matrix layout (i.e. individually addressable) such that arbitrary shapes can be generated, rather than being a segmented layout. According to some embodiments, a combination of dot-matrix layout and segmented layout is employed. According to some embodiments, central display 516 is a backlit color liquid crystal display (LCD). An example of information displayed on the electronic display 516 is illustrated in FIG. 5A, and includes central numerals 520 that are representative of a current setpoint temperature, which in this case is 67 degrees F. Also shown on the electronic display 516 is a circular arrangement of tick-marks 570 on which the current ambient temperature is shown by ambient temperature marker 572 and the adjacent small numbers "70" indicating that the ambient temperature is currently 70 degrees F. Also shown in the tick-mark circle 570 is the setpoint caret symbol 580 which graphically indicates the current setpoint temperature, which in this case is 67 degrees F. The current setpoint temperature can be simply and intuitively adjusted by a user by rotating the ring 512. In response to detecting rotation of ring 512, setpoint caret 580 is in real time rotated along the tick mark circle 570 which has been found to provide useful feedback which enhances the user experience.

The thermostat 102 is preferably constructed such that the electronic display 516 is at a fixed orientation and does not rotate with the outer ring 512, so that the electronic display 516 remains easily read by the user. For some embodiments, the cover 514 and Fresnel lens 510 also remain at a fixed orientation and do not rotate with the outer ring 512. According to one embodiment in which the diameter of the thermostat 102 is about 80 mm, the diameter of the electronic display 516 is about 45 mm. According to some embodiments the gently outwardly curved shape of the front surface of thermostat 102, which is made up of cover 514, Fresnel lens 510 and the front facing portion of ring 512, is spherical, and matches a sphere having a radius of between 100 mm and 150 mm. According to some embodiments, the radius of the spherical shape of the thermostat front is about 136 mm.

Motion sensing with PIR sensor 550 as well as other techniques can be used in the detection and/or predict of occupancy, as is described further in the commonly assigned U.S. Ser. No. 12/881,430, which is incorporated herein by reference. According to some embodiments, occupancy information is used in generating an effective and efficient scheduled program. A second downwardly-tilted PIR sensor 552 is provided to detect an approaching user. The proximity sensor 552 can be used to detect proximity in the range of about one meter so that the thermostat 102 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, for the combined purposes of inspiring user confidence and further promoting visual and functional elegance, the thermostat 102 is controlled by only two types of user input, the first being a rotation of the outer ring 512 as shown in FIG. 5A (referenced hereafter as a "rotate ring" or "ring rotation" input), and the second being an inward push on head unit 540 until an audible and/or tactile "click" occurs (referenced hereafter as an "inward click" or simply "click" input). For such embodiments, the head unit 540 is an assembly that includes all of the outer ring 512, cover 514, electronic display 516, and the Fresnel lens 510. When pressed inwardly by the user, the head unit 540 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 5A-5D, an inward click can be achieved by direct pressing on the outer ring 512 itself, or by indirect pressing of the outer ring by virtue of providing inward pressure on the cover 514, lens 510, or by various combinations thereof. For other embodiments, the thermostat 102 can be mechanically configured such that only the outer ring 512 travels inwardly for the inward click input, while the cover 514 and lens 510 remain motionless. It is to be appreciated that a variety of different selections and combinations of the particular mechanical elements that will travel inwardly to achieve the "inward click" input are within the scope of the present teachings, whether it be the outer ring 512 itself, some part of the cover 514, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 512 has been found particularly advantageous, since the user's fingers do not need to be lifted out of contact with the device, or slid along its surface, in order to go between ring rotations and inward clicks. Moreover, by virtue of the strategic placement of the electronic display 516 centrally inside the rotatable ring 512, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, U.S. Ser. No. 29/386,021, and U.S. Ser. No. 13/199,108, all of which are incorporated herein by reference.

FIGS. 5B and 5C are bottom and right side elevation views of the thermostat 102, which has been found to provide a particularly pleasing and adaptable visual appearance when viewed against a variety of different wall colors and wall textures in a variety of different home environments and home settings. While the thermostat itself will functionally adapt to the user's schedule as described herein and in one or more of the commonly assigned incorporated applications, the outer shape is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles.

According to some embodiments, the thermostat 102 includes a processing system 560, display driver 564 and a wireless communications system 566. The processing system 560 is adapted to cause the display driver 564 and display 516 to display information to the user, and to receiver user input via the rotatable ring 512. The processing system 560, according to some embodiments, is capable of carrying out the governance of the operation of thermostat 102 including various user interface features. The processing system 560 is further programmed and configured to carry out other operations as described further hereinbelow and/or in other ones of the commonly assigned incorporated applications. For example, processing system 560 is further programmed and configured to maintain and update a thermodynamic model for the enclosure in which the HVAC system is installed, such as described in U.S. Ser. No. 12/881,463, and in International Patent App. No. PCT/US11/51579, both of which are incorporated herein by reference. According to some embodiments, the wireless communications system 566 is used to communicate with devices such as personal computers and/or other thermostats or HVAC system components, which can be peer-to-peer communications, communications through one or more servers located on a private network, or and/or communications through a cloud-based service.

According to some embodiments, for ease of installation, configuration and/or upgrading, especially by a non-expert installer such as a user, the thermostat 102 includes a head unit 540 and a backplate (or wall dock) 542. As is described hereinabove, thermostat 102 is wall mounted and has circular in shape and has an outer rotatable ring 512 for receiving user input. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit(s) or from a common wire, if available, as described in further detail in co-pending patent application U.S. Ser. No. 13/034,674, and Ser. No. 13/034,678, which are incorporated by reference herein. According to some embodiments, rechargeable battery 522 is a single cell lithium-ion, or a lithium-polymer battery.

Figure 6A:
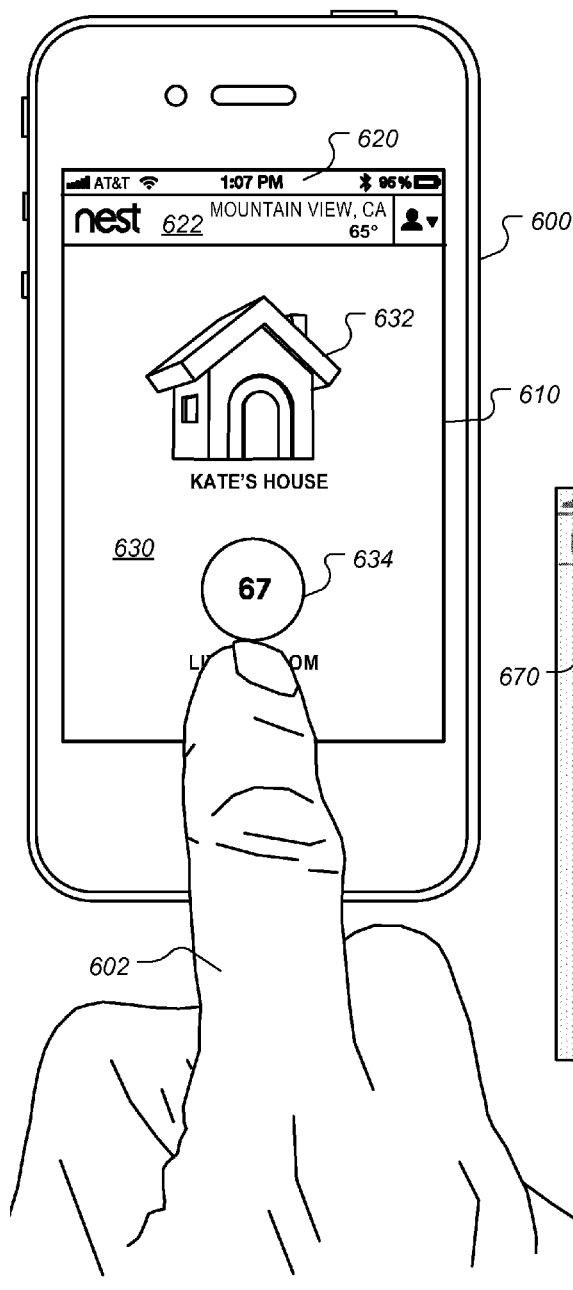
FIGS. 6A-6D illustrate aspects of a graphical user interface a touch-screen device for remotely controlling a network connected programmable thermostat, according to some embodiments.

FIGS. 6A-6D illustrate aspects of a graphical user interface a touch-screen device for remotely controlling a network connected programmable thermostat, according to some embodiments. In FIG. 6A, smartphone 600 is shown as an iPhone-4s running the Apple iOS operating system, although according to other embodiments the smartphone 600 could be a different device running a different operating system such as Android, Symbian, RIM, or Windows operating systems. Smart phone 600 has a touch sensitive display 610 on which various types of information can be shown and from which various types of user input can be received. For the example shown of an iPhone 4s, the display 610 is 3.5 inches measured diagonally. However, other smartphones may have slightly smaller, or larger displays, for example the iPhone 5 (4 inch diagonal), Samsung Galaxy S3 (4.8 inch diagonal), and Samsung Galaxy Note (5.3 inch diagonal). In any case the relatively small size of the smartphone touch screen display presents a challenge when designing a user-friendly interface. Note that while the user's hand 602 is shown in FIG. 6A to scale, in subsequent drawings, the user's hand is shown smaller in order not to overly obscure the features being described herein.

Figure 6B:
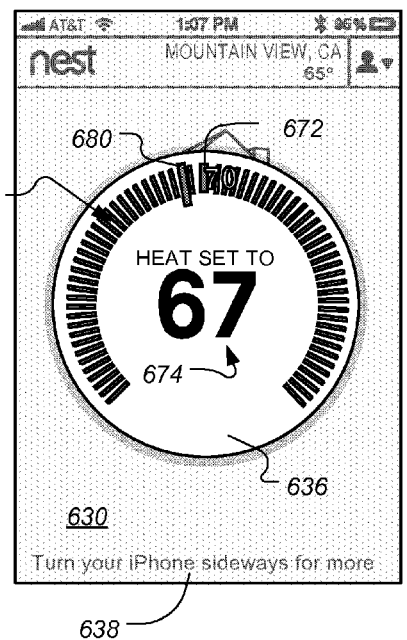

The display area shows a top information bar 620 that is generated by and is standard to the operating system of the phone 600. In FIGS. 6A and 6B, the smart phone is oriented in a portrait orientation, such that the long edge of the display 610 is vertically oriented. An upper banner are 622 includes information such as the thermostat manufacture's logo, as well as the city name and current outdoor temperature for the location where the user's thermostat is installed. A main window area 630 shows a house symbol 632 with the name assigned in which thermostat is installed. A thermostat symbol 634 is also displayed along with the name assigned to the thermostat. For further details of user interfaces for remote devices such as smartphone 600, see commonly assigned incorporated applications U.S. patent application Ser. No. 13/317,423, and Ser. No. 13/434,560. In response to a user touching the thermostat icon 634 with the finger 602 of the user, an animated transition is made to a simulated thermostat display area 636. According to some embodiments, display area 636 which is larger than the area 634 and is configured to mimic or closely resemble the display on the thermostat that is being remotely controlled. In this case, the area 636 closely resembles electronic display 516 of thermostat 102 shown in FIG. 5A. Area 636 is circular which mimics the shape of thermostat display 516 and includes many or all of the same graphical elements, including a circular arrangement of tick-marks 670, on which the current ambient temperature is indicated by the ambient temperature tick-mark symbol 672. The ambient temperature is also shown in the small numerals "70" which indicates that the ambient temperature is 70 degrees F. The current setpoint temperature is shown by the caret symbol 680 as well as the large central numerals 674. For further details on aspects of the graphical user interface of thermostats, see the commonly assigned U.S. Patent Publication No. 2012/0130546 A1, as well as commonly-assigned U.S. Pat. No. 8,195,313, both of which are incorporated by reference herein. When oriented in a portrait mode, according to some embodiments, a notification 638 is displayed that informs the user that further user interface features are available in landscape mode. When the user turns the smartphone 600 sideways, the screen transitions to a screen such as shown in FIG. 6C.

Figure 6C:
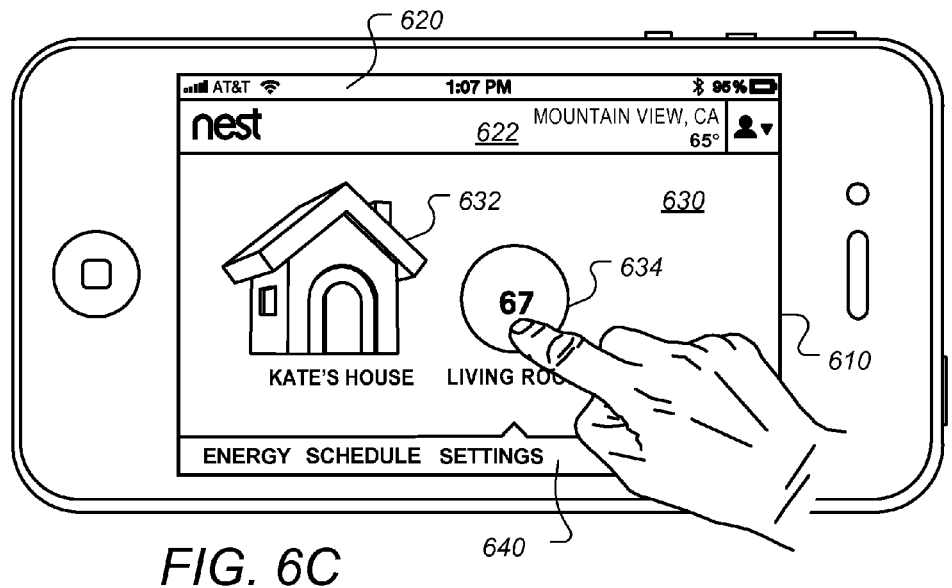

In FIG. 6C, a lower menu bar 640 has an arrow shape that points to the symbol to which the displayed menu applies. In the example shown in FIG. 6C, the arrow shape of menu 640 is pointed at the thermostat symbol 634, indicating that the menu items, namely: Energy, Schedule, and Settings, pertain to the thermostat named "living room." As in the case of FIG.

Figure 6D:
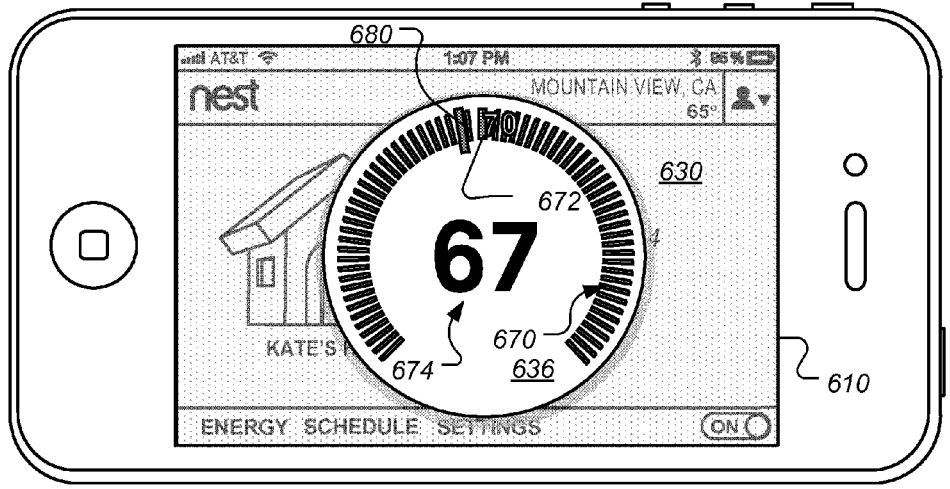

6A, in response to a user touching the thermostat icon 634, an animated transition is made to a simulated thermostat display area 636 as shown in FIG. 6D.

Figure 7A:
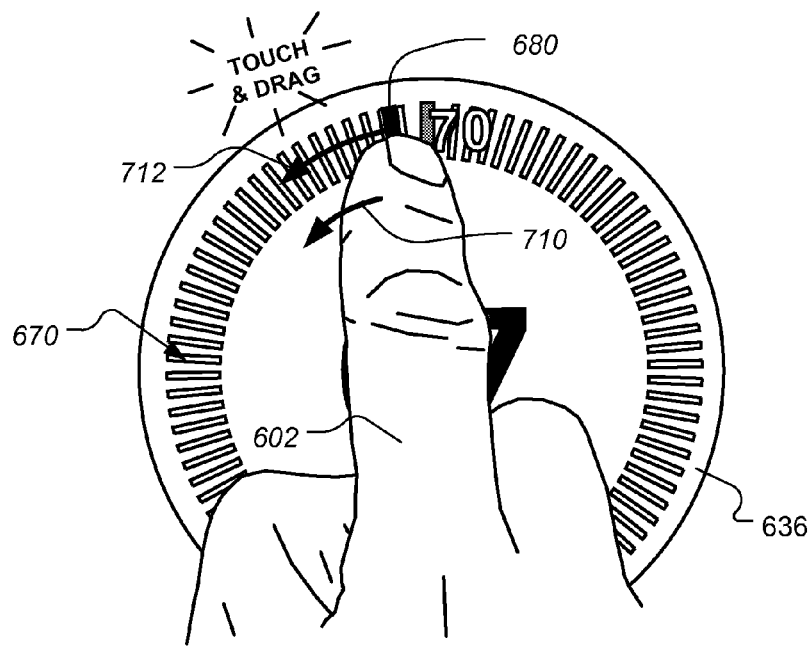
FIGS. 7A-7D illustrate aspects of a graphical user interface on a touch-screen device for remotely controlling a network connected programmable thermostat, according to some embodiments.
Figure 7B:
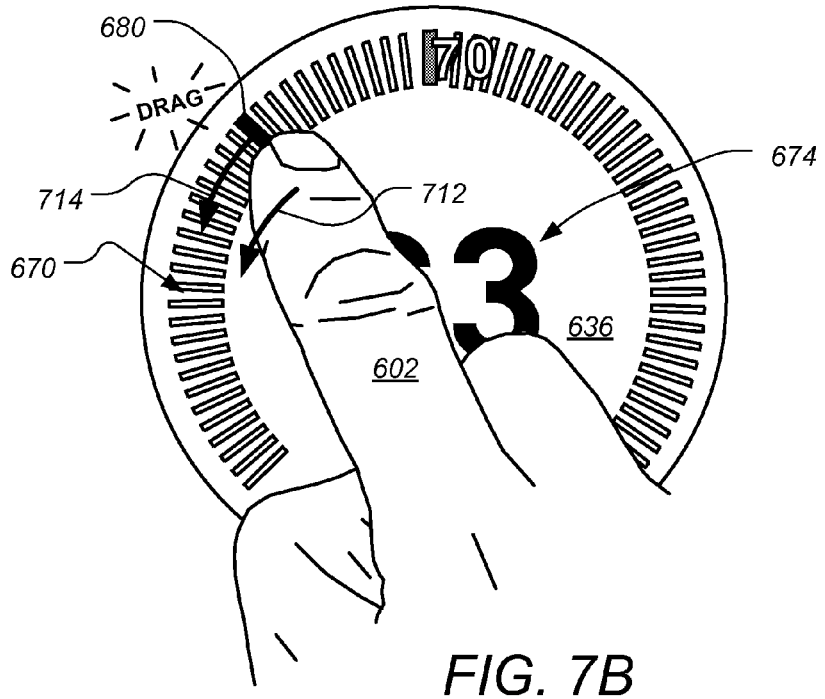
Figure 7C:
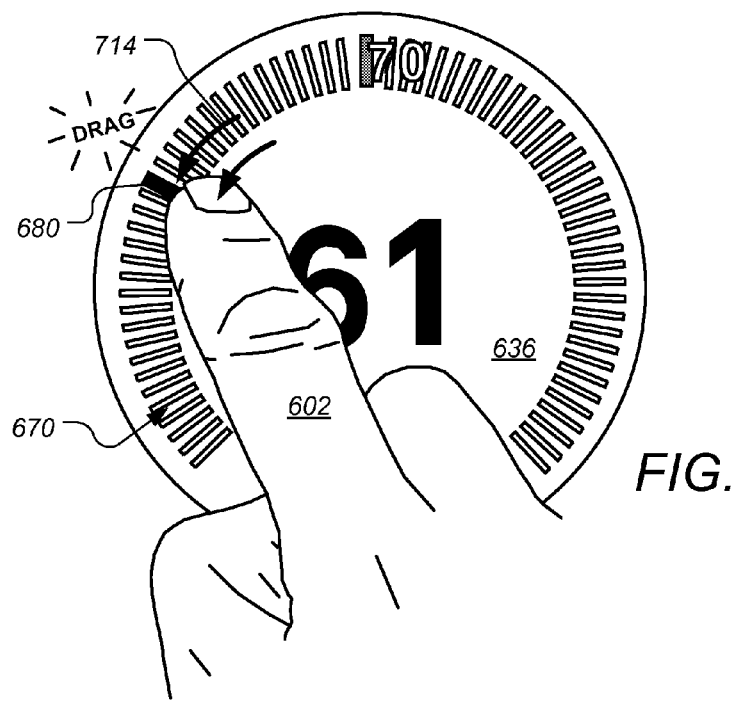
Figure 7D:
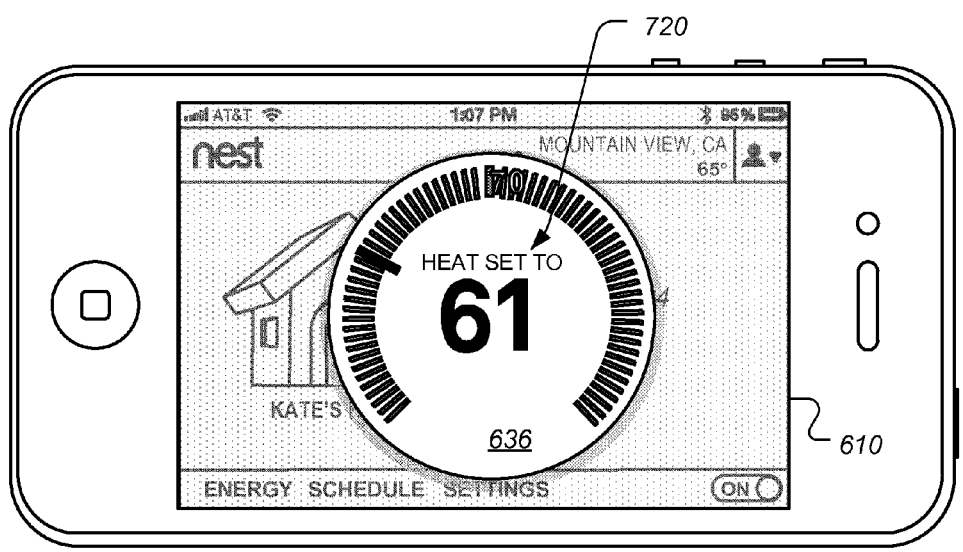

FIGS. 7A-7D illustrate aspects of a graphical user interface on a touch-screen device for remotely controlling a network connected programmable thermostat, according to some embodiments. In FIG. 7A the user touches the setpoint caret 680 with the user's finger 602 and using a "dragging" gesture slides the tip of finger 602 in a counter clockwise direction along tick-mark circle 670 as shown by arrow 710. In response to detecting the "touch and drag" gesture, the setpoint caret 680 is moved along the tick-mark circle 670 as indicated by arrow 712 so as to remain underneath the tip of the user's finger 602. FIG. 7B shows a subsequent position of the users finger 602 and the setpoint caret 680 during the dragging gesture. According to some embodiments, the central numerals 674 are changed in real-time to indicate the setpoint temperature that corresponds to the current position of the setpoint caret 680 along the tick-mark circle 670. The user's finger 602 and the setpoint caret 680 are continuing to move in a counter clockwise direction as indicated by arrows 712 and 714 respectively. In FIG. 7C the user finishes the dragging gesture at finger position shown. Note that the setpoint caret 680 now corresponds to a setpoint temperature of 61 degrees F. as indicated to the user by the central numerals 674. At this point the user lifts finger 602 from the touch screen display and the setpoint temperature remains at the position shown in FIG. 7C. FIG. 7D shows the phone 600 with display 610 on which the simulated thermostat display area 636 indicates that the current setpoint temperature is 61 degrees F., following the remote adjustment by the user as shown in FIGS. 7A-C.

Figure 8:
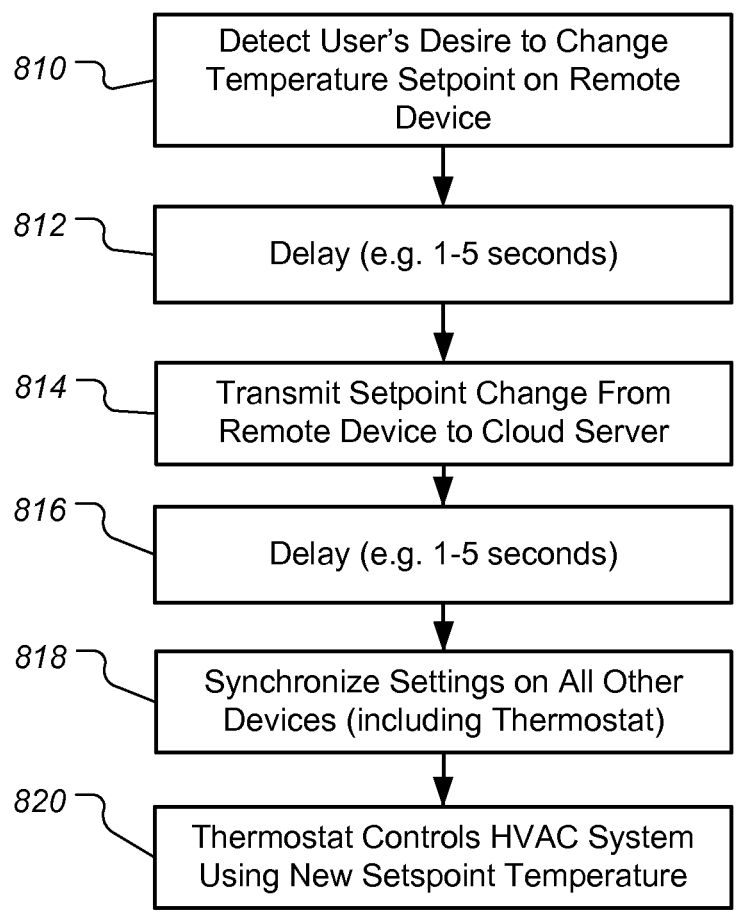
FIG. 8 is a flow chart showing aspects of updating devices with new user settings made remotely, according to some embodiments.

FIG. 8 is a flow chart showing aspects of updating devices with new user settings made remotely, according to some embodiments. In step 810, the user's desire to change a temperature setpoint is detected on a remote device, for example as shown and described with respect to FIGS. 7A-C, supra, as well as FIGS. 9A-C; 9E-F; 10A-D; 11A-F; 12A-E; 13A-D; 14A-D; 15A-C; 16A-C and 17A-C, infra. According to some embodiments, the cloud server 164 shown in FIG. 1 keeps a "state" of the thermostat 102 which includes a number of parameters defining the thermostat. The "state" parameters are synchronized between the server 164 and each of the remote devices such as smart phone, tablet PCs, web clients, as well as with the thermostat 102. Whenever any of the state defining parameters is changed on any of the remote devices then the cloud server updates all other remote devices as well as thermostat 102. According to some embodiments, in order to reduce the impact on network data traffic, HVAC system components, and/or other remote devices as well as the effected thermostat(s), a delay period 812 is introduced on the remote device that has detected the user input prior to uploading the changed setting to the cloud server. It has been found that in some cases where the user interface allows the user to easily and simply make relatively large scale changes (e.g. changes in setpoint temperature of several degrees F. or more) it is useful to introduce a delay period. It has been found that in many cases the user makes one or more large scale changes followed by smaller scale "fine-tuning" changes. In other cases, it has been found that some users find a user interface so appealing and/or fun and easy to use that they are inclined to "play" with the user interface—thereby making several changes in a relatively short period of time. It has been found that a delay period of between 0.5 seconds and 5 seconds before transmitting the change to the cloud server is suitable for allowing the user to "fine-tune" the setting or to reduce the impact of "playing" with the interface. According to some embodiments a delay of 1-2 seconds has been found to be suitable. Note that during this delay period 812, the user interface on the remote device remains responsive to user input in real time. In other words, the electronic display remains completely responsive to the user's touch and drag gestures a shown in FIGS. 7A-C, supra, as well as FIGS. 9A-C; 9E-F; 10A-D; 11A-F; 12A-E; 13A-D; 14A-D; 15A-C; 16A-C and 17A-C, infra, during the delay period 812. Following the delay period 812, in step 814 the remote device transmits the changed setting to such as via internet 162 to cloud server 164 as shown in FIG. 1. A delay step 816 on the cloud server is shown which can according to some embodiments be used instead of, or in addition to the delay period 812 on the remote device that received the user input. In step 818 the cloud server transmits the new or modified setting to all other registered devices (such as other smart phones and/or tablet PCs, web clients, etc.) as well as one or more thermostats 102 (such as shown in various FIGS. herein). In step 820 the on thermostat(s) 102 are used to control the HVAC system using the new setpoint temperature setting. It has been found that introducing a delay as in steps 812 and/or 816 can significantly reduce the impact of settings changes on certain HVAC system components. For example, using a remote device interface, if a user rapidly changes the setpoint temperature the HVAC system may be repeatedly turned on and off in a short amount of time. Although some HVAC components, such as many AC compressors, have a built in "lock out" feature that prevents rapid cycling, not all components have such protection. For example, many fan motors do not have such protection. In such cases the delay such as in steps 812 and/or 816 are useful in preventing rapid cycling of HVAC components that are otherwise unprotected.

According to some other embodiments, other methods can be used to reduce the impact on network traffic and/or HVAC components. For example, according to one embodiment if repeated reversals of setpoint change are detected (e.g. the user increases, then decreases, then increases, then decreases the setpoint temperature) then the user-interface remains active and responsive to the user's inputs, but the user interface does not send the updated temperature to the servers until after a longer delay (i.e. greater than the delay specified in step 812). Variations on this example include successively longer delay times depending on how many repeated reversals and/or conflicting changes are made within a predetermined period of time. For example, if a change is made and then un-done more than three times within 10 seconds, then the delay period in step 812 is increased to 20 seconds.

Figure 9A:
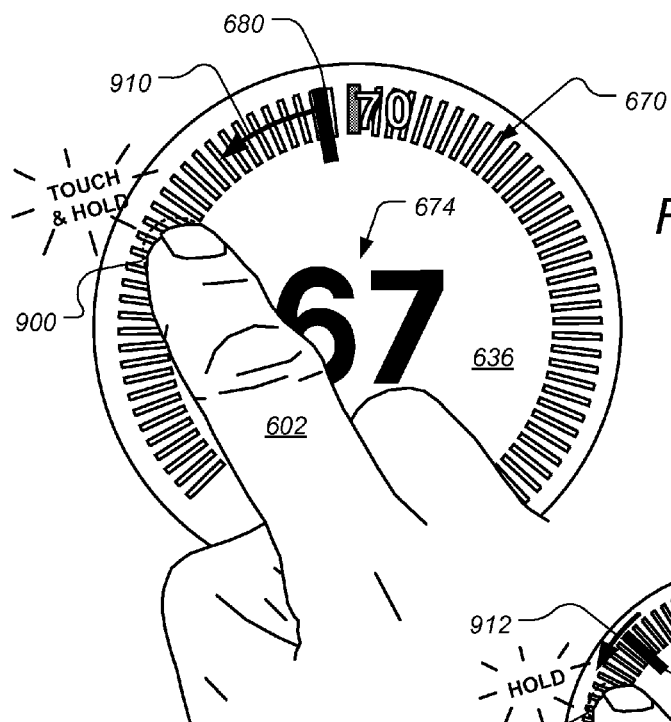
Figure 9B:
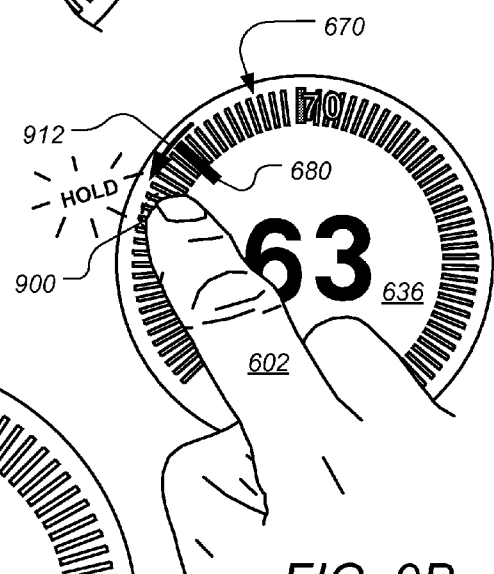
Figure 9C:
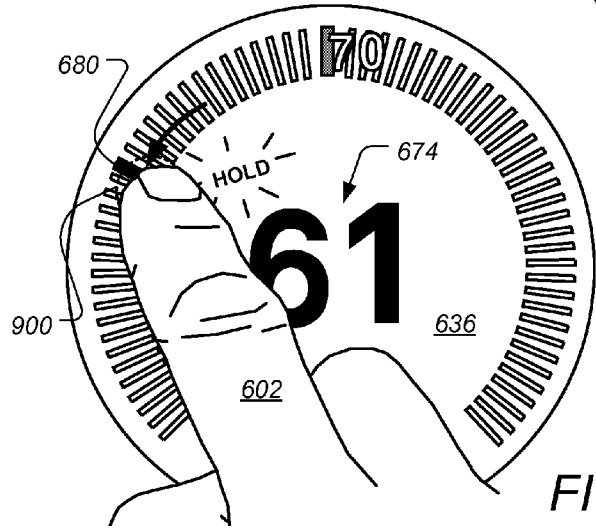

FIGS. 9A-9G illustrate aspects of a graphical user interface on a touch-screen device for remotely controlling a network connected programmable thermostat, according to some embodiments. In FIG. 9A the user touches and holds the user's finger 602 at a location 900 on the tick-mark circle 670. In response to the "touch and hold" gesture on the tic-mark circle 670, the caret 680 begins to move towards the location 900 as shown by arrow 910. FIG. 9B, shows the user interface display a short time later. The user is still holding finger 602 at location 900. The caret 680 continues to move along the tick-mark circle 670 toward the location 900 as indicated by the arrow 912. FIG. 9C shows the display 636 a short time later, when the caret 680 has arrived at the location 900 where the user has been holding finger 602. The mode of operation shown in FIGS. 9A-F can be referred to as "come to my finger" since the caret 680 comes to the location on the tick-mark circle 670 where the user's finger is being held. Note that the large central numerals 674 have been changing during the "come to my finger" modes so as to provide the user a further indication as to what settings changes are being made in response to the user's interaction.

It has been found that in providing a user interface that allows the user to simply and intuitively make large-scale changes in setting such as setpoint temperature, it is desirable to reduce the risk of the user inadvertently making sudden "surprising" changes. One way to reduce this risk while still providing the ability to quickly make large-scale changes is to initially start the change at a low rate and then progressively increase the rate of change (i.e. to accelerate the rate of change of the setpoint temperature). FIG. 9D is a plot showing two different schemes for accelerating the rate of change of the setpoint temperature for large-scale setting changes such as the "come to my finger" type of setting change shown in FIGS. 9A-C and 9E-G, according to some embodiments. In particular, both curve 920 and 922 start off at a relatively low rate of change as shown during period 924. For example, the rate of change for the first few seconds is about 1-2 degrees F. per second, while the rate of change during period 926 can be 4-6 degrees F. per second. By providing an initially slow rate of change followed by a faster rate of change, the risk of surprising large scale changes can be significantly reduced while still providing the ability to quickly make large scale changes. According to some embodiments, an audible clicking or ticking sound is produced as the setpoint temperature is changing. For example a "click" sound can be associated with each 0.5 or 1 degree F. of change. When combined with the acceleration the increasing rate of the clicking or ticking sound provides an additional indication to the user to further enhance the user experience. FIGS. 9E, 9F and 9G show an example sequence of "come to my finger" adjustment through a touch and hold gesture, in which the user simply and quickly raises the setpoint temperature from 67 degrees F. to 81 degrees F.

Figure 10A:
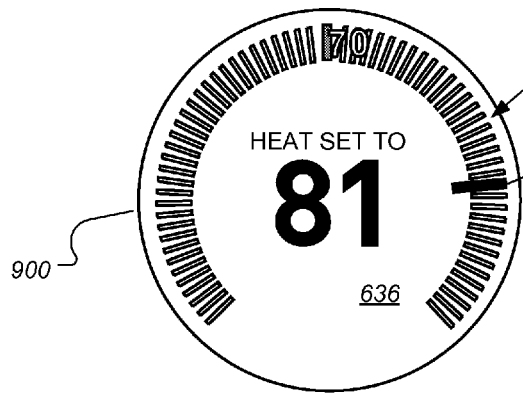
FIGS. 10A-D illustrate aspects of a graphical user interface on a touch-screen device for remotely controlling a network connected programmable thermostat, according to some embodiments.
Figure 10B:
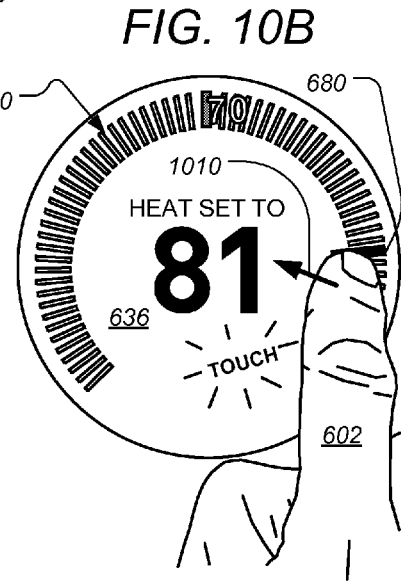
Figure 10C:
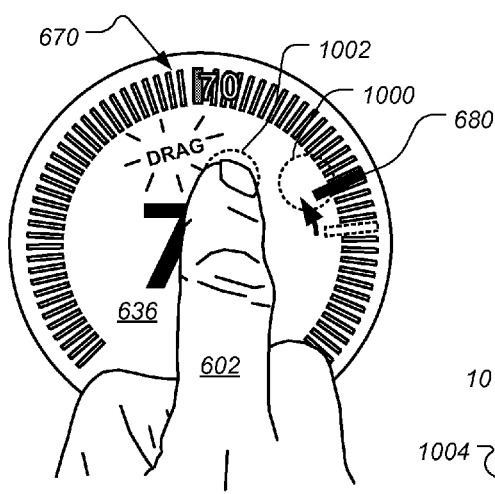
Figure 10D:
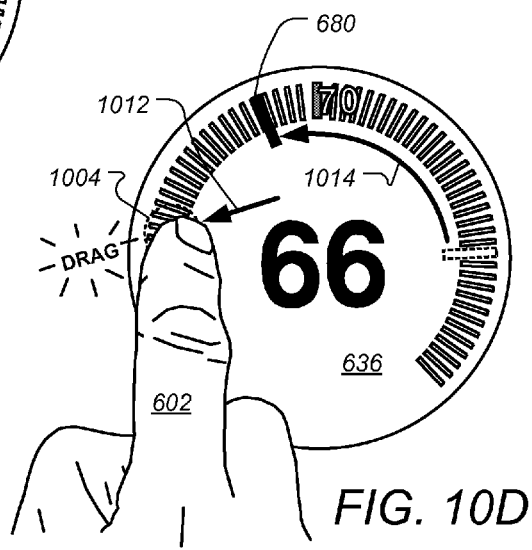

FIGS. 10A-D illustrate aspects of a graphical user interface on a touch-screen device for remotely controlling a network connected programmable thermostat, according to some embodiments. FIG. 10A shows an initial state of display area 636 in which the heating setpoint temperature is set to 81 degrees F. In this case, the user drags finger 602 through a central portion of the display area 636 rather on or along the tick-mark circle 670. In FIG. 10B, the user starts by touching the caret symbol 680, but instead of dragging finger 602 along the tick-mark circle 670 (such as shown in FIGS. 7A-C, for example), the user drags finger 602 towards the central area of display area 636 as shown by arrow 1010. In FIG. 10C, the user's finger 602 is touching the display area at a location 1002. When the user's finger is close to the tick-mark circle 670, such as at location 1000, then the user interface interprets the gesture as a simple "touch and drag" gesture, such as shown in FIGS. 7A-C. However, at some point the position of finger 602 is so far off the tick-mark circle, such as position 1002, that the user interface interprets the gesture as a new location and responds by implementing a "come to my finger" mode of adjustment such as shown in FIGS. 9A-C and 9E-F. In FIG. 10D, the user's finger 602 continues to drag across the central area of display area 636, as indicated by arrow 1012, until it is located at location 1004. In this case it is clear that a "come to my finger" adjustment mode should be implemented and the user interface responds by moving the setpoint caret symbol 680 towards the location 1004 as shown by arrow 1014. In this way, "hybrid" gestures can be interpreted by the user interface. The user may start off by dragging the caret symbol 680 along the tick-mark circle 670, but then at some point the user decides to take a "short cut" across the circle to a new location, at which point the user interface changes to "come to my finger" adjustment mode.

Figure 11A:
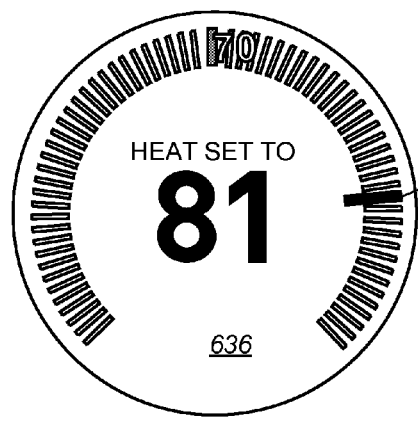
FIGS. 11A-F illustrate aspects of a graphical user interface on a touch-screen device for remotely controlling a network connected programmable thermostat, according to some embodiments.
Figure 11B:
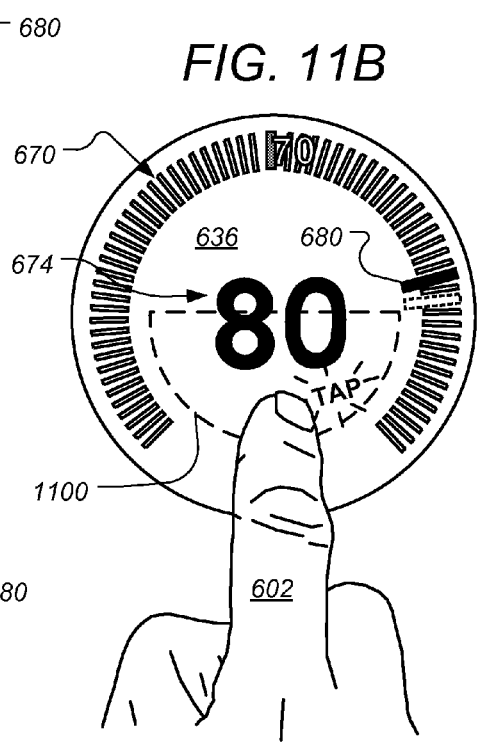
Figure 11C:
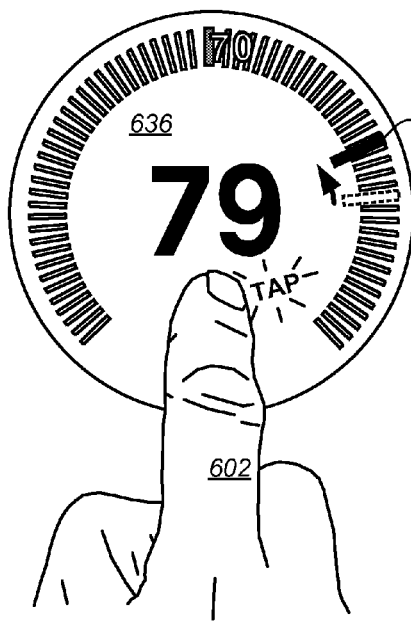
Figure 11D:
Figure 11E:
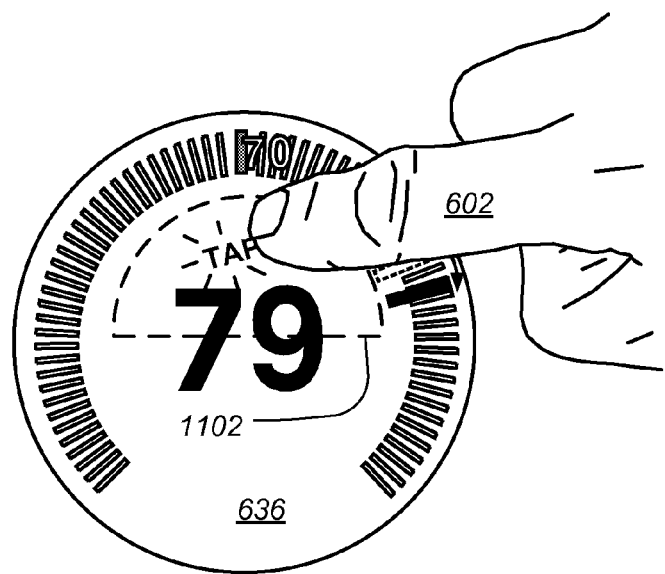
Figure 11F:
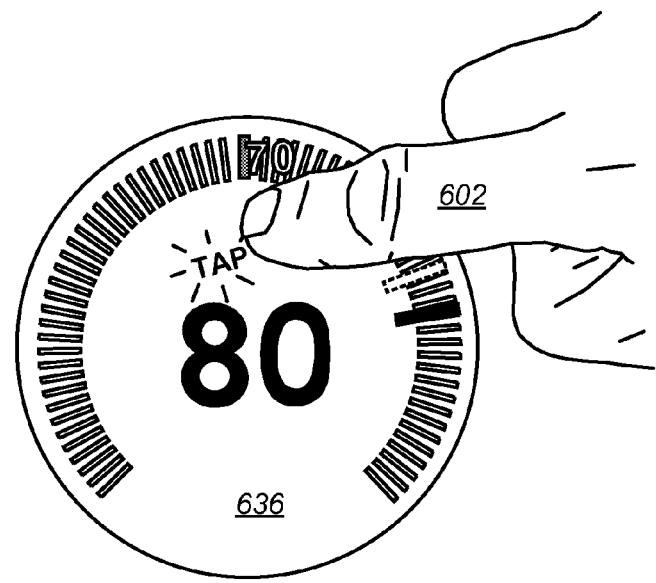

FIGS. 11A-F illustrate aspects of a graphical user interface on a touch-screen device for remotely controlling a network connected programmable thermostat, according to some embodiments. In this case, the user repeatedly taps finger 602 in the central portion of the display area 636 in order to make small scale adjustments in the setpoint temperature. FIG. 11A shows an initial state of display area 636 in which the heating setpoint temperature is set to 81 degrees F. In FIG. 11B, the user taps in a location within the lower half 1100 of the central area of display area 636, and within the tick-mark circle 670. In response to the single tap, the user interface changes the displayed setpoint lower by 1 degree F. in the central numerals 674 and the caret 680 is moved to a location corresponding to 1 degree F. lower. FIGS. 11C and 11D show the user interface response following repeated subsequent taps on the lower half of the central area, each time the setpoint temperature is lowered by 1 degree F. FIGS. 11E and 11F show the user interface response to taps in the upper half 1102 of the central area of display area 636. Each tap in the upper area 1102 results in the setpoint temperature being raised by 1 degree F.

Figure 12A:
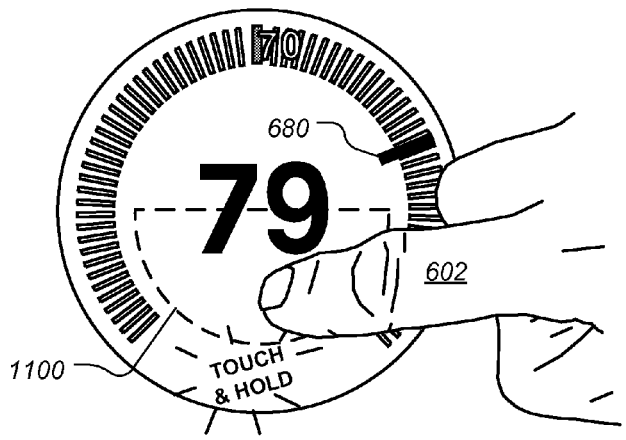
FIGS. 12A-E illustrate aspects of a graphical user interface on a touch-screen device for remotely controlling a network connected programmable thermostat, according to some embodiments.
Figure 12B:
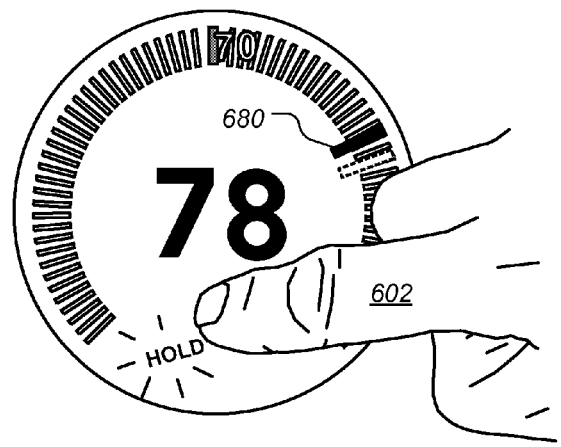
Figure 12C:
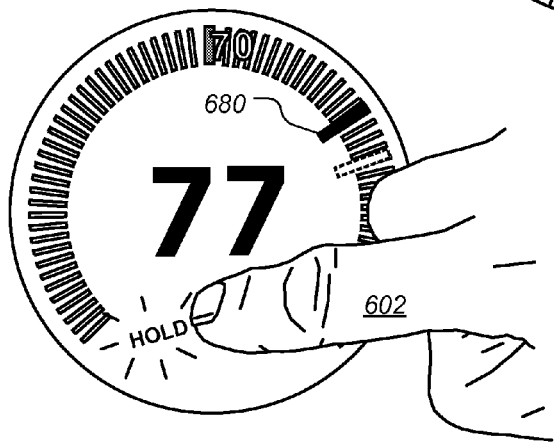
Figure 12D:
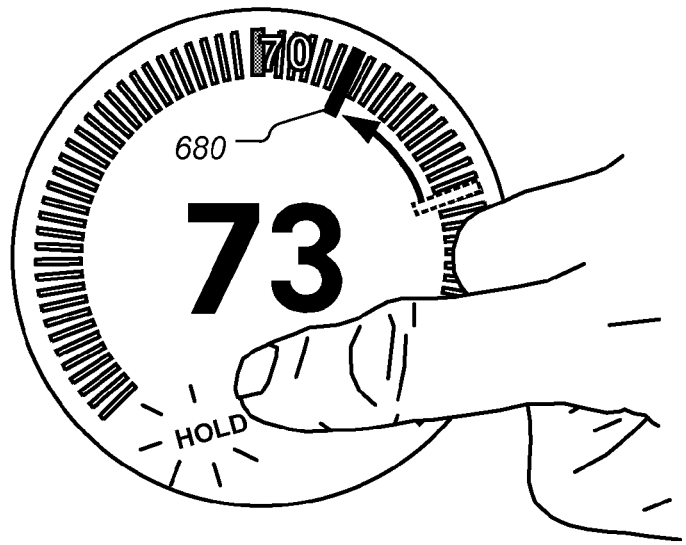
Figure 12E:
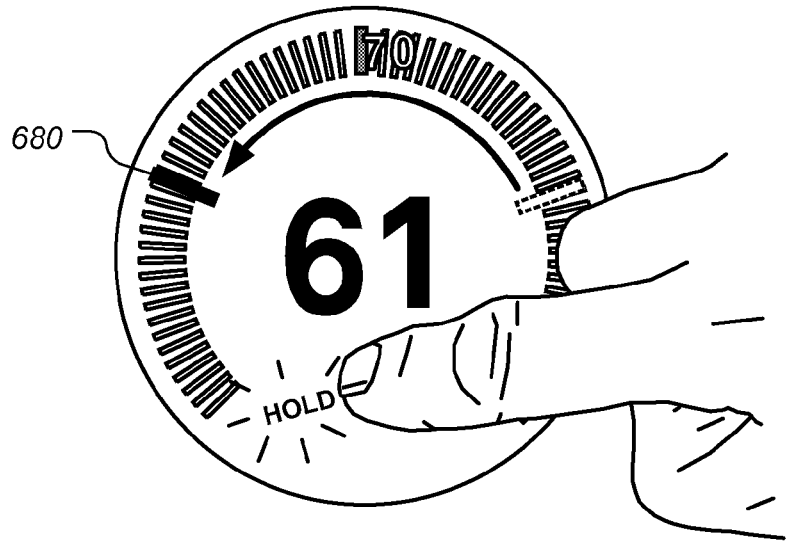

FIGS. 12A-E illustrate aspects of a graphical user interface on a touch-screen device for remotely controlling a network connected programmable thermostat, according to some embodiments. In this case, the user uses a touch and hold gesture with finger 602 in the central portion of the display area 636 in order to make large scale adjustments in the setpoint temperature. In FIG. 12A, the user uses a "touch and hold" gesture in a location within the lower half 1100 of the central area of display area 636, and within the tick-mark circle 670. In response to the touch and hold gesture, the user interface changes the displayed setpoint lower in the central numerals 674 and the caret 680 is moved to towards lower temperatures. FIGS. 12B, 12C, 12D and 12E are a sequence of successively lower setpoints as the user's finger 602 is held in the lower area 1100 on the lower half of the central area. The setpoint is lowered until the user lifts finger 602 from the area 1100. According to some embodiments, the large-scale change in response to the touch and hold gesture initially starts at low rate of change and subsequently accelerates to higher rates of change such as shown and described with respect to FIG. 9D so as to reduce the risk of inadvertent and surprising large scale changes in the setpoint temperature. The setpoint can also be raised using a touch and hold gesture in an upper area such as area 1102 shown in FIG. 11E.

Figure 13A:
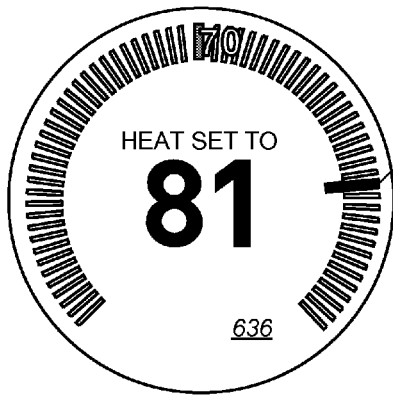
FIGS. 13A-D illustrate aspects of a graphical user interface on a touch-screen device for remotely controlling a network connected programmable thermostat, according to some embodiments.
Figure 13B:
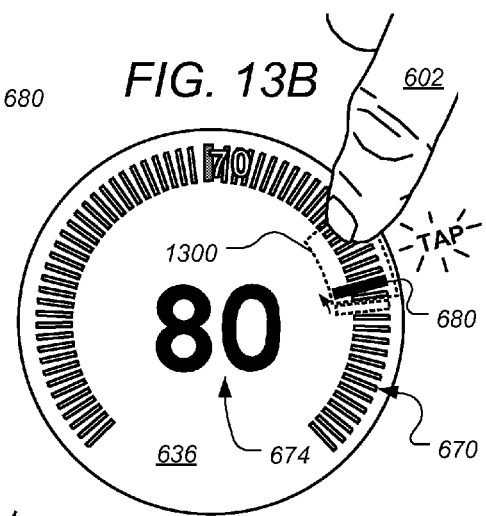
Figure 13C:
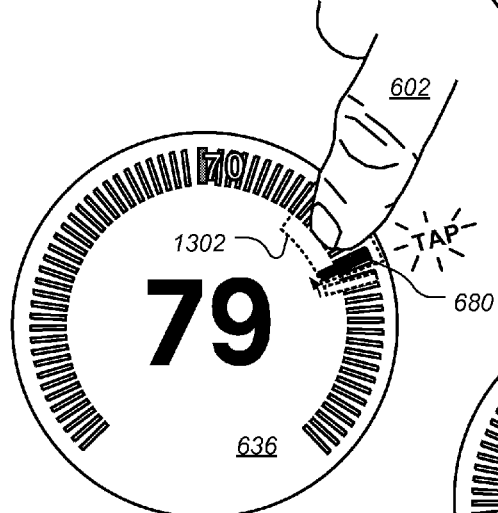

FIGS. 13A-D illustrate aspects of a graphical user interface on a touch-screen device for remotely controlling a network connected programmable thermostat, according to some embodiments. In this case, the user repeatedly taps finger 602 on the tick-mark circle 670 area on one side or the other of the setpoint caret 680 on the display area 636 in order to make small-scale adjustments in the setpoint temperature. FIG. 13A shows an initial state of display area 636 in which the heating setpoint temperature is set to 81 degrees F. In FIG. 13B, the user taps in a location 1300 of the tick mark circle 670 which is adjacent to and to the left side of the setpoint caret symbol 680 (i.e. on the side that indicates lower temperatures than represented by the location of caret symbol 680). In response to the single tap, the user interface changes the displayed setpoint lower by 1 degree F. in the central numerals 674 and the caret 680 is moved to a location corresponding to 1 degree F. lower. FIG. 13C shows the user interface response following a tap a location 1302 of the tick mark circle 670 to the left of the setpoint caret symbol 680. Note that the area 1302 has shifted slightly from the area 1300 since the active area for making this type of adjustment is relative to the location of the current setpoint caret symbol

Figure 13D:
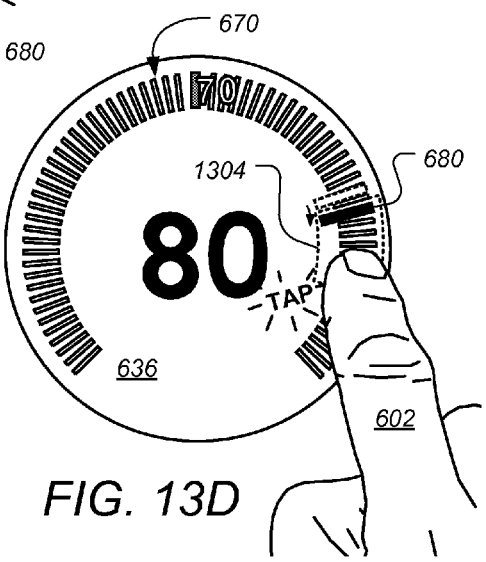

680. FIG. 13D show the user interface response following a tap a location 1304 of the tick mark circle 670 to the right of the setpoint caret symbol 680 (i.e. the side indicating higher temperatures). Each tap within the area to the right (higher temperature) side of the setpoint caret symbol results in the setpoint temperature being raised by 1 degree F.

Note that combinations of gestures described herein are contemplated and allow for intuitive means for a user to make setpoint changes using a remote touch screen device. For example in many cases the user may first make large-scale changes such as the "come to my finger" mode shown in FIGS. 9A-C and 9E-G, or "touch and hold" gestures shown in FIGS. 12A-E, followed by a "fine tuning" or small-scale adjustment such as the "touch and drag" gesture shown in FIGS. 7A-C and/or "tapping" gestures such as shown in FIGS. 11A-F and/or FIGS. 13A-D. In many cases, the "transition" from one mode to the next is performed in a very natural and intuitive way for the user. For example, is a user starts by the a "touch and hold" gestures to make a large scale change using the "come to my finger" mode as shown in FIGS. FIGS. 9A-C and 9E-G, followed by a "touch and drag" gesture for fine tuning such as shown in FIGS. 7A-C, the user is not required to lift and then "re-touch" the touch screen. Rather, according to some embodiments, the user interface automatically switches "modes" when the caret has caught up with the user's finger position. In particular, from the starting point of either FIG. 9C or FIG. 9G, the user's finger 602 is in the position shown when the caret 680 "catches up" to the user's finger 602. At this point, if the user simply drags finger 602 (without "re-touching") with clockwise or counter clockwise along tick mark circle 670, the user interface seamlessly enters the "touch and drag" mode shown in FIGS. 7A-C. In another example, the user interface automatically switches from a fine-tuning mode (e.g. the "touch and drag" gesture shown in FIGS. 7A-C) to a large scale adjustment mode (e.g. the "come to my finger" mode shown in FIGS. 9A-C and 9E-G). In this example, the user is dragging finger 602 along the tick-mark circle 670 in either a clockwise or counter clockwise direction (such as shown in FIGS. 7A-C) and the caret 680 is following the position of the finger 602. Then, at some point, the user accelerates the motion of finger 602 beyond a maximum predetermined rate of adjustment (e.g. 3-6 degrees F. per second). According to some embodiments, the user interface automatically switches to a "come to my finger" mode without requiring a "re-touch" by the finger 602. When the user accelerates beyond the threshold rate, the caret begins to "lag" behind the user's finger and the user interface operates in a "come to my finger" mode such as shown in FIGS. 9A-C and 9E-G. Note that the user is not required to lift and re-touch finger 602 to switch modes, rather the switch occurs automatically. In this way the transition between two adjustment modes is made automatically and in an intuitive and natural way so as to further enhance the user experience.

Figure 14A:
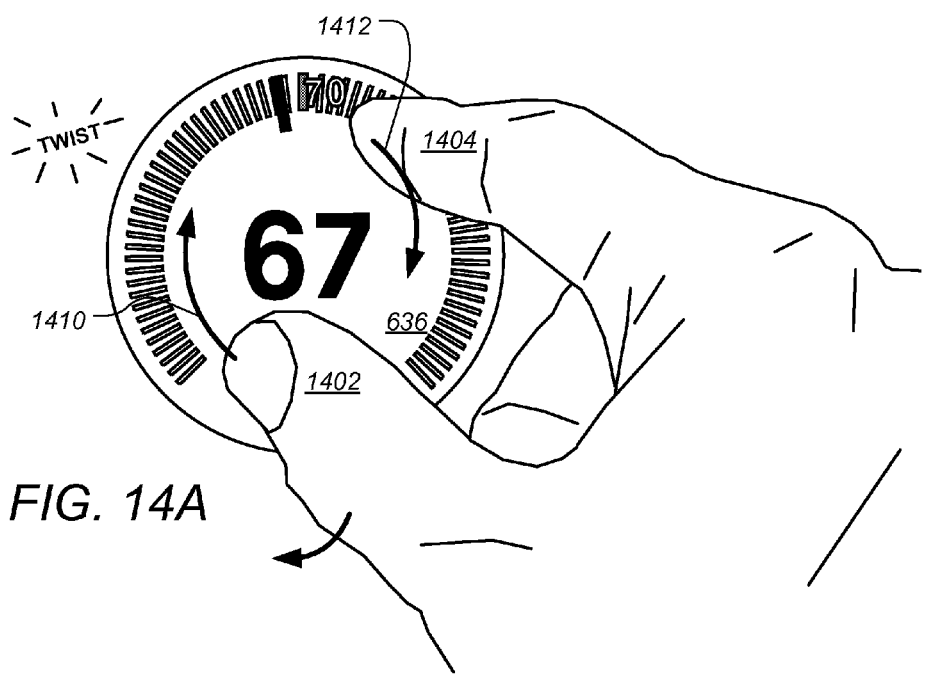
FIGS. 14A-B illustrate aspects of a graphical user interface on a touch-screen device for remotely controlling a network connected programmable thermostat, according to some other embodiments.
Figure 14B:
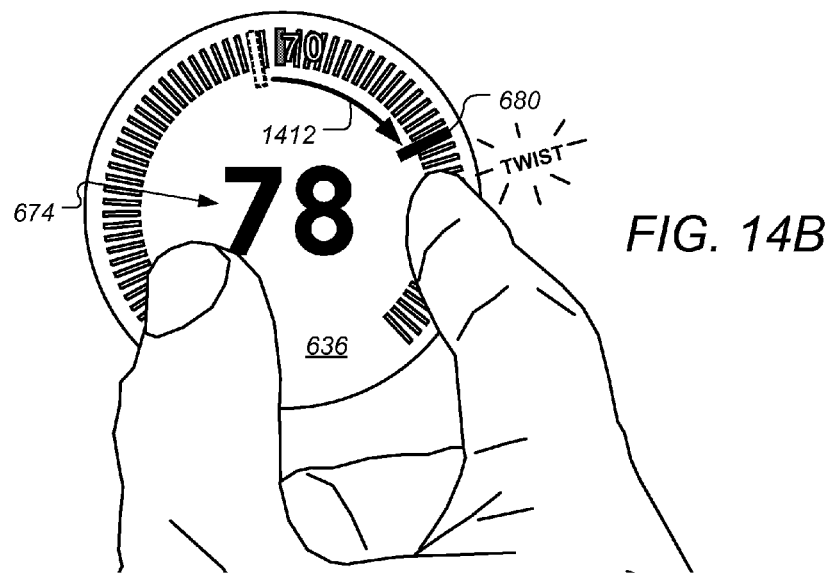

FIGS. 14A-B illustrate aspects of a graphical user interface on a touch-screen device for remotely controlling a network connected programmable thermostat, according to some other embodiments. In this case, the user performs a touch and drag gesture on display area 636 with two fingers 1402 and 1404 simultaneously in a twisting motion as indicated by arrows 1410 and 1412 as shown in FIG. 14A. FIG. 14B shows the resulting display which is displayed in real-time to the user. Note that the central numeral 674 and the setpoint caret symbol 680 are changed to give the user immediate feedback responsive to the two-finger twisting gesture. This type of gesture can be referred to as a "physical" emulation mode since the gesture used by the user mimics a gesture that would be used to rotate a physical dial. Note that as in the previously described embodiments an audible ticking or clicking sound can also be played to the user to further enhance the feedback and perceived responsiveness of the user interface.

Figures 15A, 15B, 15C:
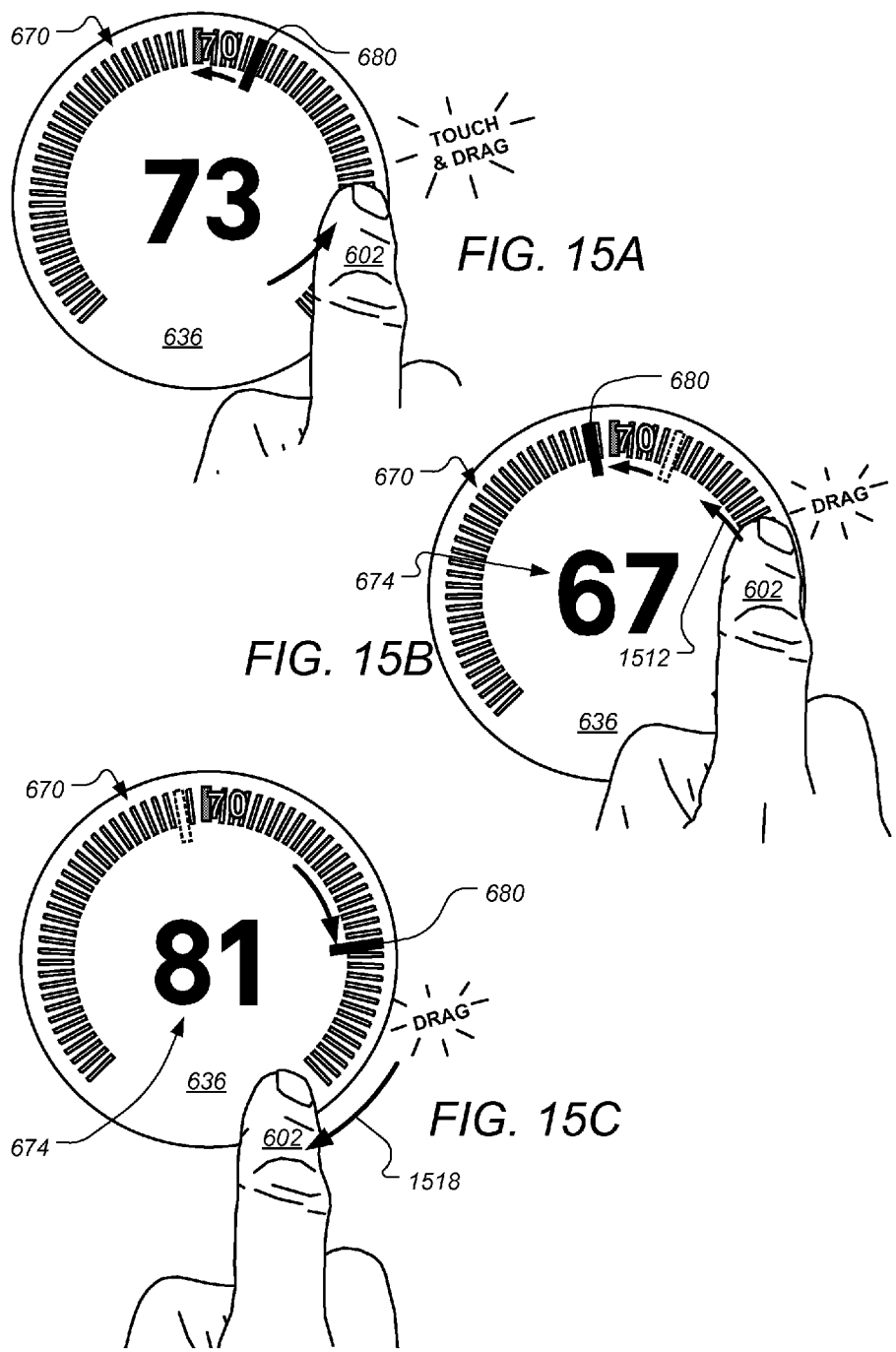
FIGS. 15A-C illustrate aspects of a graphical user interface on a touch-screen device for remotely controlling a network connected programmable thermostat, according to some other embodiments.

FIGS. 15A-C illustrate aspects of a graphical user interface on a touch-screen device for remotely controlling a network connected programmable thermostat, according to some other embodiments. The user performs a touch and drag gesture along tick-mark circle 670 with finger 602 in a similar manner as shown in FIGS. 7A-C. However, in this case the user's finger 602 is not directly on the setpoint caret symbol 680 but rather is on some other location of the tick-mark circle 670. Similarly to the gesture-adjustment mode shown in FIG. 14A-B, the mode shown in FIGS. 15A-C can be referred as a physical emulation mode since the gesture mimics one that would be used to rotate a physical dial. As shown in FIG. 15B, in response to the user's touch and drag gesture in the direction shown by arrow 1512, the setpoint temperature is in real-time adjusted as shown by the setpoint caret symbol 680 and central numerals 674. Similarly, in FIG. 15C, in response to the user's touch and drag gesture in the direction shown by arrow 1518, the setpoint temperature is in real-time adjusted as shown by the setpoint caret symbol 680 and central numerals 674. Note that as in the previously described embodiments an audible ticking or clicking sound can also be played to the user to further enhance the feedback and perceived responsiveness of the user interface.

FIGS. 16A-C illustrate aspects of a graphical user interface on a touch-screen device for remotely controlling a network connected programmable thermostat, according to some other embodiments. In this case, in response to the user's touch and drag gesture in a vertical direction (as shown by arrow 1610) by the user's finger 602, a partially transparent vertical adjustment bar 1620 is displayed overlaying the display area 636. Since the user's finger and the adjustment bar 1620 partially obstructs the user's view of the central numerals 674, a small numerical side disk 1624 is displayed so that the user can easily view the temperature currently associated with the user's finger position. In FIG. 16B, in response to the user's touch and drag gesture in a downwards direction shown by arrow 1612, the setpoint temperature is decreased as shown by the position of the setpoint caret symbol 680, central numerals 674 and small disk 1624. Similarly, In FIG. 16C, in response to the user's touch and drag gesture in an upwards direction shown by arrow 1614, the setpoint temperature is increased as shown by the position of the setpoint caret symbol 680, central numerals 674 and small disk 1624. Note that according to some embodiments a small disk numerically displaying the temperature currently associated with the user's gesture can also be provided with any of the other adjustment modes described herein. According to some embodiments, a horizontal adjustment bar can be displayed in response to a horizontal touch and drag gesture as well, or instead of the vertical adjustment bar. Note that as in the previously described embodiments an audible ticking or clicking sound can also be played to the user to further enhance the feedback and perceived responsiveness of the user interface.

FIGS. 17A-C illustrate aspects of a graphical user interface on a touch-screen device for remotely controlling a network connected programmable thermostat operating in a range-mode, according to some other embodiments. As used herein the term "range mode" refers to a mode that automatically switches between heating and cooling to maintain an enclosure within a preferred temperature range. A range modes may be useful, for example, in climates that benefit from heating and cooling in the same day. In a range mode of operation there are two simultaneous temperature setpoints—a lower heating setpoint and a higher cooling setpoint. In FIGS. 17A-C the heating setpoint is displayed the user as numerals 1702 and heating setpoint caret symbol 1722 while the cooling setpoint is displayed using numerals 1704 and cooling setpoint caret symbol 1724. The user can adjust either setpoint using a simple touch and drag gestures that is analogous to that shown in FIGS. 7A-C. For example in FIGS. 17A and 17B the user touches the cooling setpoint caret symbol 1724 and drags it to the right as shown by arrow 1710. In response, the user interface in real-time displays the movement of the caret 1724 as well as the corresponding numerals 1704. According to some embodiments, a minimum difference between the heating and cooling setpoints is enforced, so as to avoid overly energy wasteful conditions as well as the undesirable case of calling for both heating and cooling simultaneously. In the case shown in FIGS. 17A-C, a minimum difference of 5 degrees F. is enforced. Therefore, as shown in FIG. 17C, when the user attempts to move a setpoint towards the other that would caused less than the minimum difference, the other setpoint is also moved such that the minimum difference is enforce. In this case the user is moving the cooling setpoint downwards which causes the heating setpoint to also be lowered so as to maintain a minimum difference of 5 degrees F. According to some embodiments, the other adjustment methods described herein can also be used for adjusting a thermostat operating in range mode. For example, the "come to my finger" adjustment mode shown in FIGS. 9A-C and 9E-F can be implemented to make large scale changes to the set point caret closest to the location of the "touch and hold" gesture. In another example, the tap gestures of FIGS. 11A-F can be implemented for range mode by dividing the central display area into quadrants rather than halves.

Figure 18A:
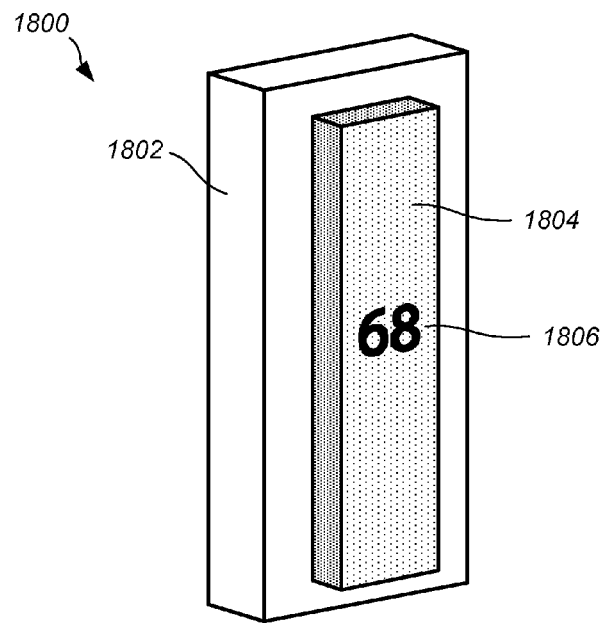
FIG. 18A illustrates a perspective view a user-friendly, non-circular thermostat according to some embodiments.
Figure 18B:
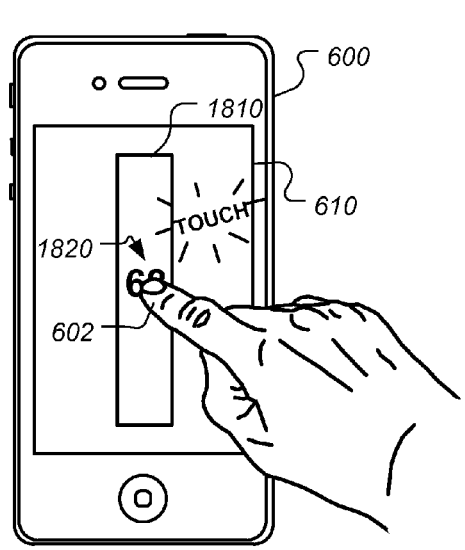
FIGS. 18B-18C illustrate aspects of a graphical user interface a touch-screen device for remotely controlling non-circular thermostat, according to some embodiments.
Figure 18C:
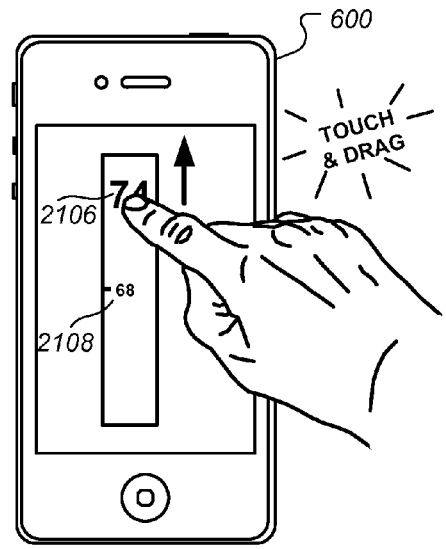

According to some embodiments, the techniques described herein are applied to non-circular thermostat displays. In particular, it has been found to be useful to display on the remote touch-screen device a graphical representation of the thermostat and/or the thermostat display in a fashion that mimics or closely resembles the thermostat and/or thermostat display. FIG. 18A illustrates a perspective view a user-friendly, non-circular thermostat 1800 according to some embodiments, comprising a frame 1802 and display/control strip 1804. The display/control strip 1804, which can comprise an LED screen behind an outwardly protruding glass touchscreen cover, is relatively long and relatively narrow, analogous to a stick of gum. According to some embodiments, the display/control strip 1804 is configured to be (i) sensitive to upward and downward finger swipes by the user to provide analog user inputs similar in purpose and effect to that of clockwise and counterclockwise rotations of the rotatable ring 512 of the thermostat 102 of FIG. 5A, supra, and (ii) inwardly pressable at one or more locations therealong, so as to provide an inward click input capability analogous to that provided with the rotatable ring 512 of the thermostat 102 of FIG. 5A, supra. Various other aspects of the visual display/control strip 1804 can be similar to those described above for the thermostat 102, such as the entire display background turning blue for cooling cycles and turning orange for heating cycles. Displayed on the display/control strip 1804 is the current setpoint temperature readout 1806. FIGS. 18B-18C illustrate aspects of a graphical user interface a touch-screen device for remotely controlling non-circular thermostat, according to some embodiments. Smart phone 600 with display 610 is shown displaying a rectangular display area 1810 that mimics the display strip 1804 on thermostat 1800 of FIG. 18A in that it uses the same aspect ratio, colors, fonts, etc. as the display strip 1804. According to some embodiments, one or more of the adjustment techniques that are described herein with respect to a round thermostat can be applied to the case of the non-round thermostat. For example, FIGS. 18B and 18C show a touch and drag gesture by the user's finger 602 on the numerals 1820 that indicate the current setpoint temperature. Examples of other of the adjustment techniques described herein applied to non-round thermostats include: "come to my finger" adjustment modes such as shown in FIGS. 9A-C and 9E-F; tap gestures such as shown in FIGS. 11A-F and/or 13A-D; touch and hold gestures such as shown in FIGS. 12A-E; as well as "physical emulation" modes such as the touch and drag gesture shown in FIGS. 15A-C.

While many of the embodiments that have been described thus far have been for a user interface on a remote touch-screen device for controlling a single programmable network connected thermostat, other variations of the described user interface techniques can be implemented, according to some embodiments. For example, according to some embodiments, the user interface described herein is used to control more than one physical thermostat simultaneously. According to another example, the user interface techniques described herein are used to control a "virtual" thermostat that does not physically exist but rather via network connection the HVAC system is controlled either locally or via a cloud server.

Figure 19:
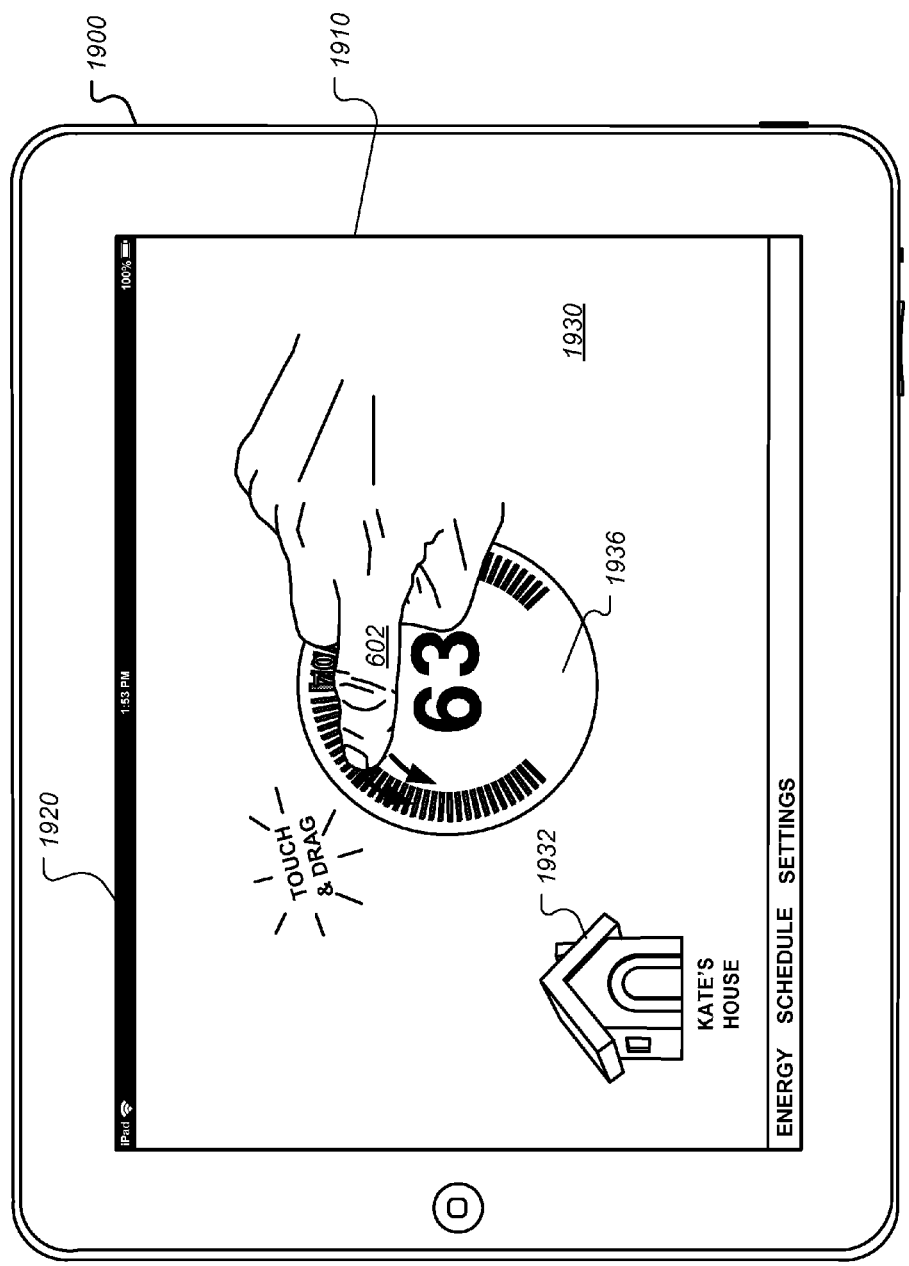
FIG. 19 shows aspects of a thermostat graphical user interface implemented on a tablet computer with a touch screen device, according to some embodiments.

While many of the embodiments that have been described thus far have been shown in the context of a smart phone touch-screen device, it will be appreciated that the adjustment techniques are also applicable to other types of touch-screen devices such as game consoles, all-in-one computers, personal data assistants (PDAs) and tablet computers. FIG. 19 shows aspects of a thermostat graphical user interface implemented on a tablet computer with a touch screen device, according to some embodiments. Each of the features described herein with respect to a smart phone touch screen device, can also be implemented on other touch screen devices such as a tablet computer. In the example shown, an iPad 1900 is running the Apple iOS operating system, although according to other embodiments the tablet 1900 could be a different device running a different operating system such as the Android, Blackberry or Windows operating systems. Tablet 1900 has a touch sensitive display 1910 on which various types of information can be shown and from which various types of user input can be received. The display area shows a top information bar 1920 that is generated by and is standard to the operating system of the tablet 1900. A main window area 1930 shows a house symbol 1932 with the name assigned in which thermostat is installed. For further details of user interfaces for remote devices such as tablet 1900, see the commonly-assigned U.S. patent application Ser. No. 13/317,423, which is incorporated herein by reference. In the example shown in FIG. 19 the user is making a touch and drag gesture using finger 602 on the display area 1936 which is analogous to the adjustment mode described in FIGS. 7A-C.

Although the concepts relating to user interfaces for touch screens have been thus far described with respect to a thermostat, according to some embodiments these concepts are applicable beyond the immediate environment of HVAC to the smart home as a whole, as well as to network-based ecosystems within which the invention may be applicable. Other applications in a smart home setting, such as shown in FIG. 1, that would benefit from remote control of a ring-based controller are contemplated. In particular, the techniques described herein are especially applicable to those systems that benefit from balancing user-responsiveness with impact on network traffic and protection of controlled equipment. Examples include electrical and/or electrical-mechanical remote controls where sudden large changes are highly undesirable and/or wasteful.

Various modifications may be made without departing from the spirit and scope of the invention. It is to be further appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described embodiments, but instead is defined by the appended claims in light of their full scope of equivalents.

What is claimed is:

1. A method of interactively and graphically interfacing with a user of an HVAC system controlled by a thermostat, the thermostat comprising a housing, a ring-shaped user-interface component, a processing system, and an electronic display, the method comprising:
    on a touch-screen display in a location separate and apart from the thermostat, graphically displaying a circular region and one or more control symbols located thereon, the one or more control symbols graphically representing user manipulation of said ring-shaped user-interface component on the thermostat;
    detecting user input motion on the touch screen display in response to a touch and drag gesture by a user which is representative of user manipulation of said ring-shaped user-interface component on the thermostat;
    dynamically identifying a setpoint temperature value based on the detected user input motion;
    on the touch-screen display, dynamically displaying in real-time information representative of the identified set point temperature value on the circular region of the touch-screen display;
    waiting for an amount of time such that there is a relatively high likelihood that the identified setpoint temperature value corresponds to a setpoint temperature desired by the user; and
    after said waiting, wirelessly transmitting data representative of said identified setpoint temperature value.

2. A method according to claim 1 further comprising controlling the HVAC system based at least in part on a comparison of measured ambient air temperature and the wirelessly transmitted data representing the identified setpoint temperature value.

3. A method according to claim 1 further comprising determining a user input completion time by which there is a relatively high likelihood that the user has arrived at a desired setpoint temperature, wherein the amount of time for said waiting is at least the determined user input completion time.

4. A method according to claim 1, wherein the graphically displaying on the touch screen display includes displaying a resemblance of the electronic display on the thermostat and wherein the one or more control symbols mimic one or more control symbols displayed on the electronic display.

5. A method according to claim 4, wherein on the electronic display of the thermostat a temperature marker symbol is displayed that moves along an arc-shaped path near an outer periphery of the electronic display in response to rotation of the ring-shaped control member, and wherein said one or more control symbols includes a temperature marker control symbol representative of the marker symbol on the thermostat electronic display.

6. A method according to claim 5, wherein the touch and drag gesture by the user includes touching and dragging the temperature marker control symbol to a new position.

7. A method according to claim 1, wherein said amount of time for waiting prior to wirelessly transmitting said data to the thermostat is a predetermined amount of time.

8. A method according to claim 7, wherein the predetermined amount of time is about 1 to 2 seconds.

9. A method according to claim 1 further comprising simultaneously and dynamically displaying numerals in a central area of the circular region, the numerals indicating a setpoint value associated with the current dynamically identified setpoint temperature value.

10. A method according to claim 1, wherein said touch and drag gesture includes touching with two or more fingers and dragging the two or more fingers in a rotational motion that mimics rotational motion of a physical control dial.

11. A method according to claim 5 further comprising detecting a touch and hold gesture performed by the user at a location on the displayed circular region of touch screen display, wherein said dynamically identifying a setpoint temperature value is based in part on the detected touch and hold gesture.

12. A method according to claim 11 wherein said graphically displaying includes displaying an arc-shaped path on the circular region on which said temperature marker control symbol is displayed, the location of the touch and hold gesture being on the displayed arc-shaped path, and the method further comprising gradually moving said temperature marker control symbol along the arc-shaped path on the circular region towards the location of the touch and hold gesture.

13. A method according to claim 12 wherein said gradually moving is performed non-linearly such that a speed of motion along the arc-shaped path accelerates over time.

14. A method according to claim 1 further comprising detecting a tapping gesture performed by the user at a second location on the touch screen display, wherein said dynamically identifying a setpoint temperature value is based in part on the detected tapping gesture.

15. A method according to claim 1 wherein said wirelessly transmitting includes wirelessly transmitting said data to a cloud based server system.

16. A method of interactively and graphically interfacing with a user of an HVAC system controlled by a thermostat, the thermostat comprising a housing, a ring-shaped user-interface component, a processing system and a rounded electronic display with a temperature marker symbol displayed thereon that moves along an arc-shaped path near an outer periphery of the electronic display in response to rotation of the ring-shaped control member, the method comprising:
    on a touch-screen display device in a location separate and apart from the thermostat, graphically displaying a circular region and an arc-shaped path near an outer periphery thereof, and a temperature control marker symbol that is positioned along the arc-shaped path of the circular region at a position associated with a current setpoint temperature value;
    detecting a user input gesture on the touch screen display in response to a touch and hold gesture by a user at a location on the arc-shaped path displayed on the circular region;

gradually moving said temperature control marker symbol along the arc-shaped path on the circular region towards the location of the touch and hold gesture;

dynamically identifying a setpoint temperature value based on the detected user input gesture; and wirelessly transmitting data representative of said identified setpoint temperature value.

17. A method according to claim 16 wherein said gradually moving is performed non-linearly such that a speed of motion along the arc-shaped path accelerates over time.

18. A method according to claim 16 further comprising waiting for an amount of time such that there is a relatively high likelihood that the identified setpoint temperature value corresponds to a setpoint temperature desired by the user, wherein said wirelessly transmitting is performed after said waiting.

19. A method according to claim 16 further comprising:
detecting a user input motion gesture on the touch screen display in response to a touch and drag gesture by the user in which the user touches a location corresponding to the displayed temperature control marker symbol and drags in a direction along the displayed arc-shaped path; and on the touch-screen display, dynamically moving in real-time the temperature control marker symbol along the displayed arc-shaped path in response to the detected user input motion gesture.

20. A method according to claim 16 further comprising:
detecting a user input tapping gesture on the touch screen display in response to a tapping gesture by the user in which the user taps a location on the circular region; and on the touch-screen display, dynamically moving in real-time the temperature control marker symbol along the displayed arc-shaped path in response to the detected user input tapping gesture.

21. A method according to claim 20 wherein the location on the circular region of the user tapping is in a central region at least partially bounded by the arc-shaped path.

22. A method according to claim 20 wherein the location on the circular region of the user tapping is on the arc-shaped path.

23. A method according to claim 16 wherein the graphically displaying includes dynamically displaying numerals indicating a setpoint temperature currently associated with the position of the temperature control marker symbol along the arc-shaped path.

24. A method according to claim 16 further comprising making a sound audible to the user corresponding to the moving of said temperature control marker symbol along the arc-shaped path.

25. A system for interactively and graphically interfacing with a user of an HVAC system comprising:
a thermostat comprising:
a housing;
a ring-shaped user-interface component;
a processing system configured to control an HVAC system based at least in part on a comparison of a measured ambient air temperature and a setpoint temperature value;
a rounded electronic display under operative control of the processing system; and
a touch screen display device operable from a location separate and apart from the thermostat, the touch screen display device including a touch screen display and a processing system communicatively coupled thereto, the display device processing system programmed and configured to:

graphically display a circular region and one or more control symbols located thereon, the one or more control symbols graphically representing user manipulation of said ring-shaped user-interface component on the thermostat;

detect user input motion on the touch screen display in response to a touch and drag gesture by a user which is a representative of user manipulation of said ring-shaped user-interface component on the thermostat;

dynamically identify a setpoint temperature value based on the detected user input motion;

on the touch screen display, dynamically display in real-time information representative of the identified set point temperature value corresponding to a setpoint temperature desired by the user;

waiting for an amount of time such that there is a relatively high likelihood that the identified setpoint temperature value corresponds to a setpoint temperature desired by the user;

after said waiting, wirelessly transmitting data representative of said identified setpoint temperature value so as to update the setpoint temperature value of the thermostat.

26. A system according to claim 25 wherein the touch screen display device is a smart phone.

27. A system according to claim 25 wherein the touch screen display device is a tablet computer.

28. A system according to claim 25 further comprising a cloud based server system configured to receive and store the wirelessly transmitted data representative of the identified setpoint temperature value from the touch screen display device and transmit said data to the thermostat for use in controlling the HVAC system.

29. A system according to claim 25, wherein the thermostat processing system is configured to display on the electronic display a temperature marker symbol that moves along an arc-shaped path near an outer periphery of the electronic display in response to rotation of the ring-shaped control member, the one or more control symbols located on the circular region of the touch screen display include a temperature marker control symbol representative of the temperature marker symbol on the thermostat electronic display, and the touch and drag gesture by the user includes touching and dragging the temperature marker control symbol to a new position on an arc-shaped path on the circular region.

30. A system according to claim 29 wherein the touch screen device processing system is further configured to:
detect a touch and hold gesture performed by the user at a location on the displayed arc-shaped path of circular region; and
gradually move said temperature marker control symbol along the arc-shaped path on the circular region towards the location of the touch and hold gesture, wherein said gradually movement is performed non-linearly such that a speed of motion along the arc-shaped path accelerates over time.

31. A system according to claim 25 wherein the touch screen device processing system if further configured to detect a tapping gesture performed by the user at a location on the touch screen display, wherein said dynamically identified setpoint temperature value is based in part on the detected tapping gesture.

32. A system according to claim 25 wherein the touch screen device processing system is further configured to dynamically display numerals in a central area of the circular region, the numerals indicating a setpoint value associated with the current dynamically identified setpoint temperature value.

* * * * *